US010958932B2

(12) United States Patent
Chien et al.

(10) Patent No.: US 10,958,932 B2
(45) Date of Patent: Mar. 23, 2021

(54) INTER-PREDICTION CODING OF VIDEO DATA USING GENERATED MOTION VECTOR PREDICTOR LIST INCLUDING NON-ADJACENT BLOCKS

(71) Applicant: QUALCOMM Incorporated, San Diego, CA (US)

(72) Inventors: Wei-Jung Chien, San Diego, CA (US); Yu Han, San Diego, CA (US); Han Huang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/566,571

(22) Filed: Sep. 10, 2019

(65) Prior Publication Data

US 2020/0084468 A1     Mar. 12, 2020

Related U.S. Application Data

(60) Provisional application No. 62/730,495, filed on Sep. 12, 2018, provisional application No. 62/732,526, filed on Sep. 17, 2018.

(51) Int. Cl.
    *H04N 11/02*       (2006.01)
    *H04N 19/52*       (2014.01)
    (Continued)

(52) U.S. Cl.
    CPC ........... *H04N 19/52* (2014.11); *H04N 19/105* (2014.11); *H04N 19/139* (2014.11); *H04N 19/176* (2014.11)

(58) Field of Classification Search
    CPC ....................................... H04N 19/52
    (Continued)

(56) References Cited

U.S. PATENT DOCUMENTS 10,027,981 B2 *   7/2018   Xu .......................... H04N 19/52
10,491,902 B1     11/2019   Xu et al.
(Continued)

FOREIGN PATENT DOCUMENTS

EP     2745515 A2     6/2014

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Leron Beck
(74) *Attorney, Agent, or Firm* — Shumaker & Sieffert, P.A.

(57) ABSTRACT

An example device for coding video data includes a processor configured to construct a motion vector predictor list for a current block of video data. The processor adds motion vectors for a first set of blocks that immediately neighbor the current block to the motion vector predictor list. The processor determines whether motion vectors for a second set of blocks that are separated from the current block by one or more blocks are duplicates of motion vectors in the motion vector predictor list, and if not, adds the motion vectors to the motion vector predictor list. The processor inter prediction codes the current block with a motion vector and codes the motion vector using the motion vector predictor list. The processor may further use a temporal motion vector as a motion vector predictor for the motion vector.

28 Claims, 10 Drawing Sheets

(51) Int. Cl.
    *H04N 19/105* (2014.01)
    *H04N 19/139* (2014.01)
    *H04N 19/176* (2014.01)
(58) Field of Classification Search
    USPC .............................................. 375/240.01–29
    See application file for complete search history.

(56) References Cited

U.S. PATENT DOCUMENTS

| | | | |
|---|---|---|---|
| 10,735,720 B2* | 8/2020 | Lee | H04N 19/157 |
| 2011/0194609 A1 | 8/2011 | Rusert et al. | |
| 2012/0128060 A1 | 5/2012 | Lin et al. | |
| 2012/0134415 A1 | 5/2012 | Lin et al. | |
| 2012/0275522 A1 | 11/2012 | Kim et al. | |
| 2013/0208795 A1* | 8/2013 | Xu | H04N 19/176 375/240.16 |
| 2013/0272404 A1 | 10/2013 | Park et al. | |
| 2013/0336406 A1 | 12/2013 | Zhang et al. | |
| 2013/0343459 A1 | 12/2013 | Bici et al. | |
| 2014/0023144 A1 | 1/2014 | Park et al. | |
| 2014/0126643 A1 | 5/2014 | Park et al. | |
| 2014/0269916 A1* | 9/2014 | Lim | H04N 19/577 375/240.15 |
| 2014/0341284 A1 | 11/2014 | Kim et al. | |
| 2014/0348241 A1 | 11/2014 | Lim et al. | |
| 2015/0264386 A1 | 9/2015 | Pang et al. | |
| 2016/0080770 A1* | 3/2016 | Bae | H04N 19/176 375/240.16 |
| 2016/0286232 A1* | 9/2016 | Li | H04N 19/513 |
| 2016/0330474 A1* | 11/2016 | Liu | H04N 19/56 |
| 2017/0054996 A1* | 2/2017 | Xu | H04N 19/52 |
| 2017/0094271 A1* | 3/2017 | Liu | H04N 19/105 |
| 2017/0195677 A1* | 7/2017 | Ye | H04N 19/159 |
| 2017/0238005 A1 | 8/2017 | Chien et al. | |
| 2017/0264914 A1* | 9/2017 | Agyo | H04N 19/139 |
| 2017/0295370 A1* | 10/2017 | Xu | H04N 19/139 |
| 2017/0310961 A1* | 10/2017 | Liu | H04N 19/107 |
| 2018/0288430 A1 | 10/2018 | Chen et al. | |
| 2020/0036997 A1 | 1/2020 | Li et al. | |
| 2020/0053379 A1 | 2/2020 | Han et al. | |
| 2020/0195961 A1 | 6/2020 | Toma et al. | |

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v1, 11th Meeting: Ljubljana, SI, Jul. 10-18, 2018, 19 pages.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Ergen S., "ZigBee/IEEE 802.15.4 Summary", Sep. 10, 2004, 37 pp.
Han (Qualcomm) Y., et al., "CE4.2.3: Improvement on Merge/Skip Mode", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0339, Jul. 7, 2018 (Jul. 7, 2018), 7 Pages, XP030199065, Retrieved from the Internet: URL: http://phenix.int-evry.fr/jvet/doc_end_user/documents/11_Ljubljana/wg11/JVET-K0339-v2.zip JVET-K0339_v2.docx [retrieved on Jul. 7, 2018] Section 2.
IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/MAN Standards Committee; IEEE Standard 802.11acTM-2013, Published on Dec. 18, 2013, 425 Pages.
International Search Report and Written Opinion—PCT/US2019/050653—ISA/EPO—dated Nov. 26, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, "Series H: Audiovisual and Multimedia Systems, Infrastructure of audiovisual services—Coding of moving video, High efficiency video coding," The International Telecommunication Union. Dec. 2016, 664 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Sullivan G., et al., "Overview of the High Efficiency Video Coding (HEVC) Standard", IEEE Transactions on Circuits and Systems for Video Technology, vol. 22 (12), Dec. 2012 (Jan. 1, 2012), pp. 1649-1668, XP055045358, US ISSN: 1051-8215, DOI: 10.1109/TCSVT.2012.2221191.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Bross et al., "Versatile Video Coding (Draft 5)", Joint Video Experts Team (JVET) of ITU-T SG 16 WP 3 and ISO/IEC14 UTC 1/SC 291WG 11, 14th Meeting: Geneva, CH, Mar. 19-27, 2019, JVET-N1001-v8, 400 pp.
Chen Y-W., et al., "Description of SDR, HDR and 360° Video Coding Technology Proposal by Qualcomm and Technicolor—low and High Complexity Versions", 10. JVET Meeting, Apr. 4, 2018-Apr. 20, 2018, San Diego, (The Joint Video Exploration Team of ISO/IEC JTC1/SC29/WG11 and ITU-T SG.16 ), URL:http://phenix.int-evry.fr/jvet/ No. JVET-J0021-v5, Apr. 14, 2018 (Apr. 14, 2018), XP030151183, pp. 1-43, section 3: "360°"; p. 25-p. 26, figure 11, section 2.8.2.1.
Han Y., et al., "CE4: Modification on History-based Motion Vector Prediction", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0126, Jan. 19, 2019 (Jan. 19, 2019), 9 pages, XP030202546, Retrieved from the Internet: URL: http://phenix.int-evry.fr/jvet/doc_end_user/documents/13_Marrakech/wg11/JVET-M0126-v9.zip JVET-M0126_r6.docx [retrieved on Jan. 19, 2019], the whole document.
Han Y., et al., "CE4-Related: Simplification on Non-Adjacent Merge/Skip mode", Joint Video Experts Team (JVET) of ITU-T SG 16 WP 3 and ISO/IEC JTC 1/SC 29/WG 11, JVET-L0400, 12th Meeting: Macao, CN, Oct. 3-12, 2018, pp. 1-4.
Li (Tencent) G., et al., "CE4-related; extension of merge and AMVP Candidates for inter prediction", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0301, Jul. 11, 2018 (Jul. 11, 2018), XP030199447, 5 Pages, Retrieved from the Internet: URL: http://phenix.int-evry.fr/jvet/doc_end_user/documents/11_Ljubljana/wg11/JVET-K0301-v2.zip JVET-K0301_r1.docx [retrieved on Jul. 11, 2018], figure 2, section 2, table 2.
Ma X., et al., "CE3: CCLM/MDLM Coefficients Derivation Method Using One Luma Line Buffer (Test 5.5.1 and 5.5.2)", Joint Video

(56) References Cited

OTHER PUBLICATIONS

Experts Team (JVET) of ITU-T SG 16 WP 3 and ISO/IEC JTC 1/SC 29/WG 11, JVET-L0339_r1, 12th Meeting: Macao, CN, Oct. 3-12, 2018, pp. 1-4.

Solovyev (Huawei) T., et al., "Non-CE4: Merge mode modification", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0056, Jul. 4, 2018 (Jul. 4, 2018), XP030198953, 4 Pages, Retrieved from the Internet: URL:http://phenix.int-evry.fr/jvet/doc_end_user/documents/11_Ljubljana/wg11/JVET-K0056-v3.zip JVET-K0056-v01.docx [retrieved on Jul. 4, 2018], figure 2, sections 1 and 2.1.

Zhou T., et al., "Spatial-temporal merge mode (non subblock STMVP)", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0532_r2, Jul. 13, 2018 (Jul. 13, 2018), XP030199702, Retrieved from the Internet: URL:http://phenix.int-evry.fr/jvet/doc_end_user/documents/11_Ljubljana/wg11/JVET-K0532-v1.zip JVETK0532_K0161_r2.doc [retrieved on Jul. 13, 2018], section 2.

\* cited by examiner

INTER-PREDICTION CODING OF VIDEO DATA USING GENERATED MOTION VECTOR PREDICTOR LIST INCLUDING NON-ADJACENT BLOCKS

This application claims the benefit of U.S. Provisional Application No. 62/730,495, filed Sep. 12, 2018, and of U.S. Provisional Application No. 62/732,526, filed Sep. 17, 2018, the entire contents of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for predictor selection, such as for motion vectors. The techniques may be applied to existing video codecs, such as HEVC (High Efficiency Video Coding) or be an efficient coding tool in future video coding standards. For example, this disclosure describes example techniques to generate motion vector predictors for a current block from neighboring blocks and corresponding temporal blocks. The motion vector for the current block is derived based on the motion vector predictors. In some examples, the techniques may be used to reduce the complexity of motion vector predictor list generation through use of a fast pruning algorithm. The motion vector predictor list may be used in merge candidate list generation, or in the field of other motion vector predictor list generation, such as advanced motion vector prediction (AMVP) list and affine MVP list.

In one example, a method of coding (encoding or decoding) a current block of video data includes constructing a motion vector predictor list for a current block of video data, wherein constructing the motion vector predictor list comprises: determining motion vectors for blocks of a first set of blocks, the first set of blocks comprising blocks that immediately neighbor the current block; determining a first motion vector for a first block of a second set of blocks, the second set of blocks comprising blocks that are separated from the current block by one or more blocks; determining a second motion vector for a second block of the second set of blocks; determining whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, inserting the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list; inter-prediction coding the current block using a motion vector for the current block; and coding the motion vector using the motion vector predictor list.

In another example, a device for coding a current block of video data includes a memory configured to store video data; and one or more processors implemented in circuitry and configured to: construct a motion vector predictor list for a current block of the video data, wherein to construct the motion vector predictor list, the one or more processors are configured to: determine motion vectors for blocks of a first set of blocks, the first set of blocks comprising blocks that immediately neighbor the current block; determine a first motion vector for a first block of a second set of blocks, the second set of blocks comprising blocks that are separated from the current block by one or more blocks; determine a second motion vector for a second block of the second set of blocks; determine whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list; inter-prediction code the current block using a motion vector for the current block; and code the motion vector using the motion vector predictor list.

In another example, a computer-readable storage medium has stored thereon instructions that, when executed, cause a processor to construct a motion vector predictor list for a current block of video data, wherein to construct the motion vector predictor list, the instructions cause the processor to: determine motion vectors for blocks of a first set of blocks, the first set of blocks comprising blocks that immediately neighbor the current block; determine a first motion vector for a first block of a second set of blocks, the second set of blocks comprising blocks that are separated from the current block by one or more blocks; determine a second motion vector for a second block of the second set of blocks; determine whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list; inter-prediction code the current block using a motion vector for the current block; and code the motion vector using the motion vector predictor list.

In another example, a device for coding video data includes means for constructing a motion vector predictor list for a current block of video data, wherein the means for constructing the motion vector predictor list comprises: means for determining motion vectors for blocks of a first set of blocks, the first set of blocks comprising blocks that immediately neighbor the current block; means for determining a first motion vector for a first block of a second set of blocks, the second set of blocks comprising blocks that are separated from the current block by one or more blocks; means for determining a second motion vector for a second block of the second set of blocks; means for determining whether the second motion vector is the same as the first motion vector for the first block of the second set of blocks or the same as a motion vector of a block from a subset of blocks of the first set of blocks; means for inserting the second motion vector as a motion vector predictor in the motion vector predictor list in response to determining that the second motion vector is not the same as the first motion vector for the first block of the second set of blocks and not the same as any motion vector of any block from the subset of blocks of the first set of blocks; means for bypassing inserting the second motion vector as a motion vector predictor in the motion vector predictor list in response to determining that the second motion vector is the same as the first motion vector for the first block of the second set of blocks or is the same as a motion vector of any block from the subset of blocks of the first set of blocks; means for inter-prediction coding the current block using a motion vector for the current block; and means for coding the motion vector using the motion vector predictor list.

The details of one or more examples are set forth in the accompanying drawings and the description below. Other features, objects, and advantages will be apparent from the description, drawings, and claims.

DETAILED DESCRIPTION

Figure 1:
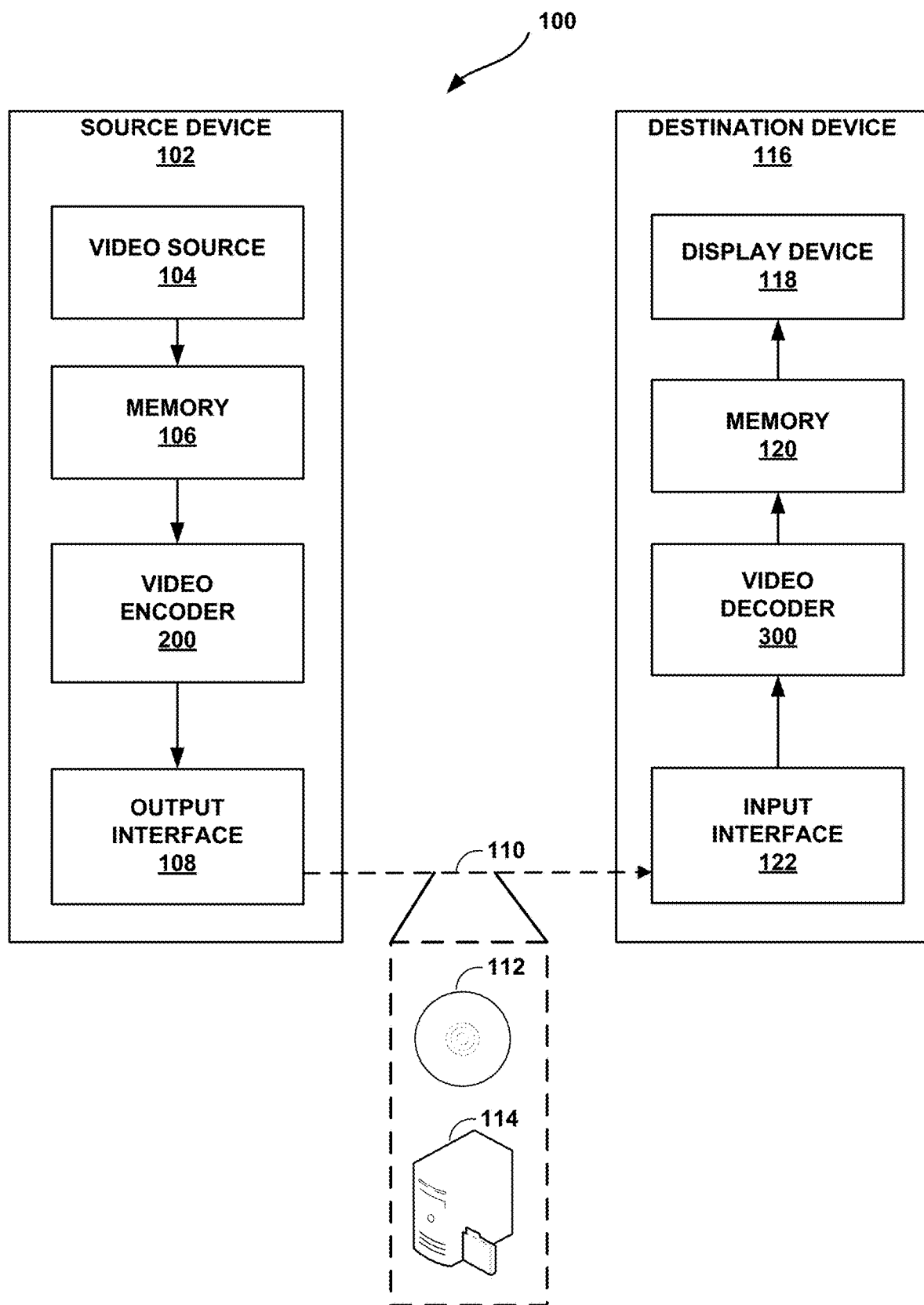
FIG. 1 is a block diagram illustrating an example video encoding and decoding system that may perform the techniques of this disclosure.

This disclosure is related to motion vector predictor selection. In video coding, such as in inter-prediction, a current block is predicted based on a prediction block. A motion vector of the current block identifies a reference block to use to generate the prediction block. Signaling the <x,y> coordinates of the motion vector may require more bandwidth than motion vector predictor techniques by which a video decoder can derive the motion vector.

For example, in motion vector predictor techniques, such as those of merge/skip mode, advanced motion vector prediction (AMVP) mode, or affine merge/AMVP mode, a video encoder and a video decoder each construct the same motion vector predictor lists that includes a list of motion vectors that act as candidate predictors for the motion vector of the current block. The motion vector predictors in the motion vector predictor list may be motion vectors of spatially neighboring or proximate blocks or motion vectors of temporal blocks (e.g., blocks in different pictures than the current picture that includes the current block being encoded or decoded).

Rather than signaling the <x,y> coordinates, the video encoder signals an index into the motion vector predictor list. The video decoder determines the motion vector predictor based on the index into the motion vector predictor list and generates the motion vector for the current block based on the motion vector predictor. For example, in merge mode, the video decoder sets the motion vector for the current block equal to the motion vector predictor. In AMVP mode, the video decoder also receives a motion vector difference (MVD) between the motion vector and the motion vector predictor. The video decoder adds the MVD to the motion vector predictor to determine the motion vector for the current block.

This disclosure describes example techniques for constructing the motion vector predictor list. For instance, one technical problem that may arise that impacts coding efficiency is duplicates of motion vector predictors can be present in the motion vector predictor list (e.g., the same motion vector predictor is present in multiple locations in the motion vector predictor list). In such cases, there may not be sufficient space available in the motion vector predictor list, and better motion vector predictors may not be included in the motion vector predictor list because the duplicates of the motion vector predictors have used up available slots in the motion vector predictor list.

One way to overcome such deficiencies is to "prune" the motion vector predictor list to remove duplicates of motion vector predictors. However, as the size of the motion vector predictor list increases, the number of clock cycles needed to check to make sure there are not duplicates can cause a slow down in the video encoding or decoding process.

This disclosure describes one or more example techniques that provide for fast pruning, even where the size of the motion vector predictor list is relatively large. For example, a video coder (e.g., video encoder or video decoder) may group neighboring blocks into sets of blocks (e.g., a first set of blocks, a second set of blocks, and so forth).

Additionally or alternatively, the video coder may determine whether a maximum number of pruning operations has been performed on the motion vector predictor list. In some examples, if the number of pruning operations reaches the maximum allowed number, the video coder may add new potential candidates to the list without pruning. In some examples, if the number of pruning operations reaches the maximum allowed number, the video coder may not add new potential candidates to the list. The video coder may also add default candidates to the list.

The video coder may include a motion vector of a first block in the second set of blocks. The video coder may then determine whether a motion vector for a second block in the second set of blocks is the same as the motion vector of the first block in the second set of blocks, or the same as the motion vector of a subset of blocks of the first set of blocks. The subset may include the first two blocks of the first set of blocks that have motion vectors, as one example.

If the motion vector for the second block is the same as any of these motion vectors, the video coder may bypass inserting (e.g., not insert or avoid inserting) the motion vector of the second block in the second set of blocks in the motion vector predictor list. If the motion vector for the second block is different than all of these motion vectors, the video coder may insert the motion vector of the second block in the second set of blocks in the motion vector predictor list.

The video coder may repeat such operations for other blocks in the second group of blocks and repeat such operations for blocks in the third group of blocks. In the above example, the first block in the second set of blocks is a block that may be the spatially closest block to the second block of the second set of blocks, and the first block may be a block that was previously checked to determine whether the motion vector of the first block is to be included in the motion vector predictor list.

In some examples, the first set of blocks includes block that immediately neighbor the current block. The second, third, and so forth, sets of blocks include blocks that are separated from the current block by one or more blocks.

The video coder may also determine additional motion vector predictors. For instance, the video coder may determine additional motion vector predictors based on motion vectors of blocks in the first group, motion vectors of blocks in the second group, motion vectors of blocks in the third group, and so forth. In one example, the video coder may average the motion vectors of two or more blocks in the first set of blocks and a temporal motion vector predictor to determine a first additional motion vector predictor. The video coder may perform similar operations with the second set of blocks and the third set of blocks to determine two more motion vector predictors.

In this way, this disclosure describes examples of techniques to construct a motion vector predictor list in an efficient manner that the video encoder and video decoder use for inter-prediction. These example techniques may addresses technical issues present in the operation of a video coder, such as reduction in processing time, when the video coder is determining whether or not to include a motion vector predictor in the motion vector predictor list.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for constructing a motion vector predictor list. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for constructing a motion vector predictor list. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) for the Versatile Video Coding (VCC) standard currently under development. The VCC standard is described in more detail below. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM for VVC. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In accordance with the techniques of this disclosure, as discussed in greater detail below, after performing the motion search to identify a motion vector to generate the prediction block, video encoder 200 may encode the motion vector. In particular, video encoder 200 may construct a motion vector predictor list to include motion vectors of a variety of spatially and/or temporally neighboring blocks to the current block. In particular, a first set of neighboring blocks may be immediately adjacent to the current block, and a second set of neighboring blocks may be separated from the current block by one or more blocks. Video encoder 200 may avoid adding a motion vector of the second set of blocks to the motion vector predictor list if the motion vector is the same as a motion vector of the first set of blocks. Video encoder 200 may then select a motion vector predictor from the motion vector predictor list and encode the motion vector used to generate the prediction block using the motion vector predictor.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

The following describes some techniques related to video coding, such as that of a joint exploration model (JEM). Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) studied the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The Joint Video Experts Team (JVET) of ITU-T WP3/16 and ISO/IEC JTC 1/SC 29/WG 11 held its eleventh meeting during 10-18 Jul. 2018 at the GR—Ljubljana Exhibition and Convention Centre (Dunaj ska cesta 18, 1000 Ljubljana, Slovenia). The name Versatile Video Coding (VVC) was chosen as the informal name for the new standard.

As described above, in HEVC, the largest coding unit in a slice is called a coding tree block (CTB) or coding tree unit (CTU). A CTB contains a quad-tree the nodes of which are coding units.

The size of a CTB can be from 16×16 to 64×64 in the HEVC main profile (although technically 8×8 CTB sizes can be supported). A coding unit (CU) could be the same size of a CTB or as small as 8×8. Each coding unit is coded with one mode. When a CU is inter coded, the CU may be further partitioned into 2 or 4 prediction units (PUs) or become just one PU when further partition does not apply. When two PUs are present in one CU, the two PUs can be half size rectangles or two rectangle size with ¼ or ¾ size of the CU.

When the CU is inter coded, one set of motion information is present for each PU. In addition, each PU is coded with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector (MV) candidate list is also referred to as motion vector predictor list. The motion vector(s), as well as reference indices in the merge mode, of the current PU are generated by taking a candidate from the MV candidate list.

According to HEVC, the MV candidate list (or motion vector predictor list) includes up to 5 candidates (e.g., five motion vector predictors) for the merge mode and only two candidates (e.g., two motion vector predictors) for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index can be explicitly signaled, together with an MV predictor (MVP) index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 2A:
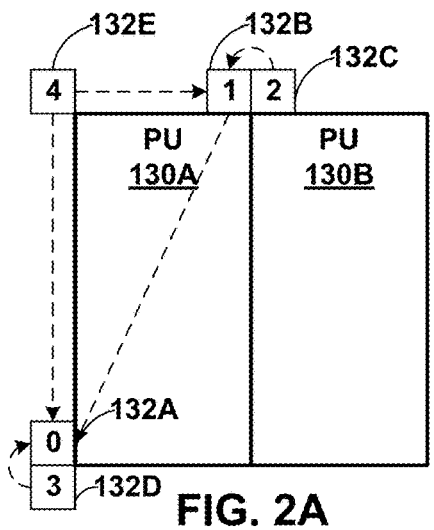
FIGS. 2A and 2B are conceptual diagrams illustrating examples of spatial neighboring motion vector candidates for merge and advanced motion vector prediction (AMVP) modes, respectively.
Figure 2B:
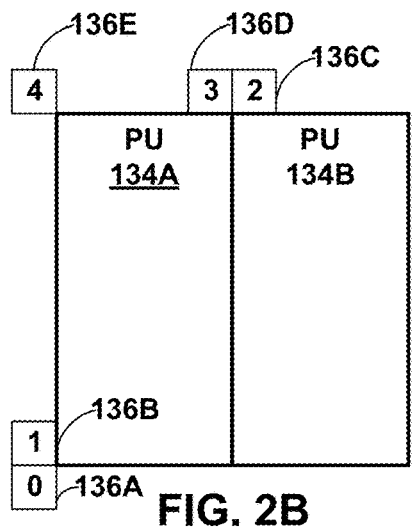

FIGS. 2A and 2B are conceptual diagrams illustrating examples of spatial neighboring motion vector candidates for merge and advanced motion vector prediction (AMVP) modes, respectively. In particular, FIG. 2A depicts PUs 130A and 130B. PU 130A has spatial neighboring candidates 132A-132E (spatial neighboring candidates 132), from which motion information may be selected as a motion vector predictor for merge mode. FIG. 2B depicts PUs 134A and 134B. PU 134A has spatial neighboring candidates 136A-136E (spatial neighboring candidates 136), from which motion information may be selected as a motion vector predictor for AMVP mode.

Video encoder 200 and video decoder 300 may be configured to predict motion information using spatial neighboring candidates 132, 136. Video encoder 200 and video decoder 300 may derive spatial MV candidates from neighboring blocks, e.g., as shown in FIGS. 2A and 2B, for a specific PU (PU 130A in FIG. 2A, PU 134A in FIG. 2B), although the techniques for generating the candidates from the blocks may differ for merge and AMVP modes.

According to HEVC, in merge mode, up to four spatial MV candidates can be derived with the orders shown in FIG. 2A with numbers. In the example of HEVC, the order is the following: left (0, A1, spatial neighboring candidate 132A), above (1, B1, spatial neighboring candidate 132B), above right (2, B0, spatial neighboring candidate 132C), below left (3, A0, spatial neighboring candidate 132D), and above left (4, B2, spatial neighboring candidate 132E), as shown in FIG. 2A. In AVMP mode of HEVC, the neighboring blocks are divided into two groups: the left group including blocks 0 and 1 (spatial neighboring candidates 136A, 136B, respectively), and the above group including blocks 2, 3, and 4 (spatial neighboring candidates 136C-136E, respectively) as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate, thus the temporal distance differences can be compensated.

Figure 3A:
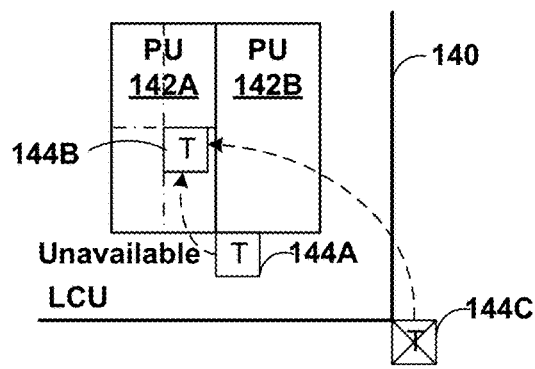
FIGS. 3A and 3B are conceptual diagrams illustrating examples of a temporal motion vector predictor (TMVP) candidate and motion vector scaling for TMVP, respectively.
Figure 3B:
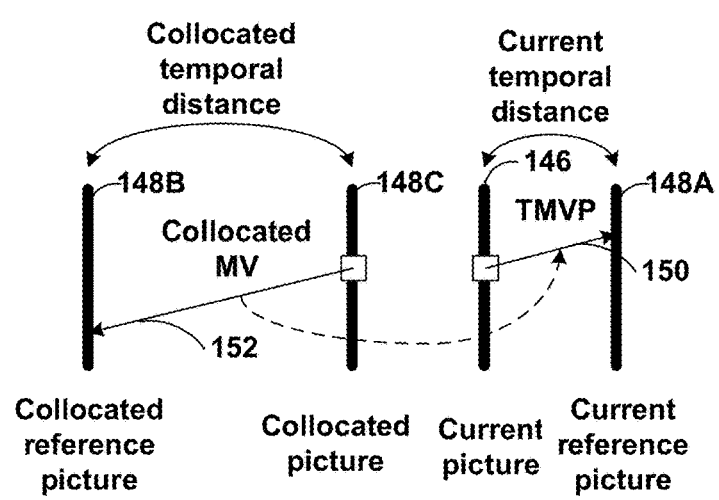

FIGS. 3A and 3B are conceptual diagrams illustrating examples of a temporal motion vector predictor (TMVP) candidate and motion vector scaling for TMVP, respectively. In particular, FIG. 3A depicts LCU 140 including PUs 142A, 142B. PU 142A has TMVP candidates 144A and 144B, and LCU 140 has TMVP candidate 144C.

Video encoder 200 and video decoder 300 may add one of TMVP candidates 144A-144C (TMVP candidates 144), if enabled and available, into the MV candidate list (e.g., motion vector predictor list) after spatial motion vector candidates. The process of motion vector derivation for the TMVP candidate may be the same for both merge and AMVP modes. However, the target reference index for the TMVP candidate in merge mode may be set to 0.

In HEVC, the primary block location for TMVP candidate derivation is the bottom right block outside of the collocated PU (TMPV candidate 144A as shown in FIG. 3A) to compensate for the bias to the above and left blocks used to generate spatial neighboring candidates. However, if TMVP candidate 144A is located outside of the current CTB row or motion information is not available (e.g., as with TMVP candidate 144C), TMVP candidate 144A is substituted with a center block of the PU, i.e., TMVP candidate 144B.

Video encoder 200 and video decoder 300 may derive a motion vector for the one of TMVP candidates 144 from the co-located PU of the co-located picture, indicated in the slice level. The motion vector for the co-located PU is called the collocated MV. As shown in FIG. 3B, video encoder 200 and video decoder 300 may derive TMVP candidate motion vector 150 for a current block of current picture 146 (which refers to current reference picture 148A) from collocated MV 152, which starts at collocated picture 148C and refers to collocated reference picture 148B. Similar to temporal direct mode in AVC, to derive TMVP candidate motion vector 150, colocated MV 152 may need to be scaled to compensate the difference between the temporal distance between collocated picture 148C and collocated reference picture 148B and the temporal distance between current picture 146 and current reference picture 148A, as shown in FIG. 3A.

Figure 4A:
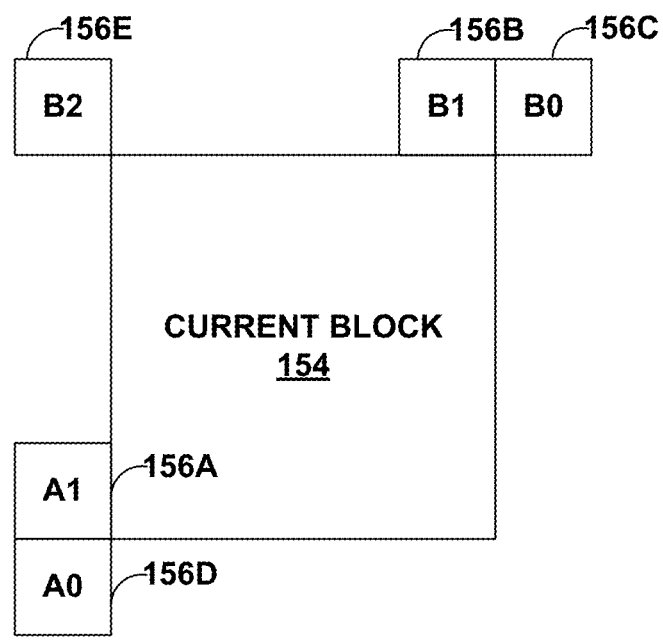
FIG. 4A is a conceptual diagram illustrating examples of spatial neighboring motion vector candidates for merge/skip modes.

FIG. 4A is a conceptual diagram illustrating examples of spatial neighboring motion vector candidates for merge/skip modes. FIG. 4A depicts current block 154 and neighboring blocks 156A-156E (neighboring blocks 156). Video encoder 200 and video decoder 300 may perform motion vector prediction in merge/skip mode. For the skip mode and merge mode of HEVC, a merge index is signaled (e.g., for the motion vector predictor list) to indicate which of neighboring blocks 156 (i.e., which candidate) in the merging candidate list is used. No inter prediction indicator, reference index, or MVD is transmitted. Two types of merging candidates may be considered in merge mode: spatial motion vector predictor (SMVP) and temporal motion vector predictor (TMVP). For SMVP derivation according to HEVC, a maximum of four merge candidates are selected among candidates that are located in positions as depicted in FIG. 4A. The order of derivation is $A_1 \rightarrow B_1 \rightarrow B_0 \rightarrow A_0 \rightarrow (B2)$ in HEVC, i.e., neighboring blocks 156A→156B→156C→156D→156E. In HEVC, position B2 is considered only when any PU of position $A_1$, $B_1$, $B_0$, $A_0$ is not available or is intra coded or the total number of candidates, after pruning, from positions $A_1$, $B_1$, $B_0$, $A_0$ is less than four.

Figure 4B:
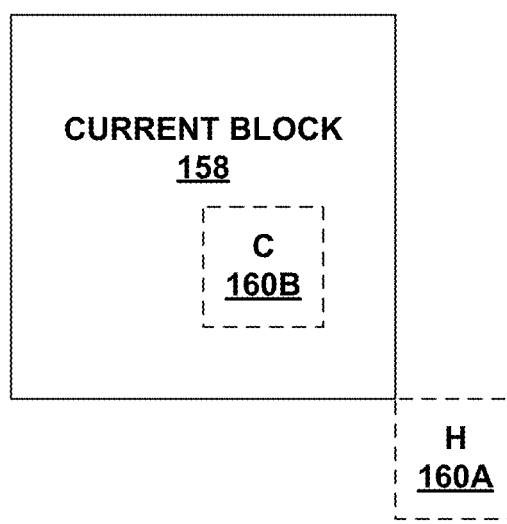
FIG. 4B is a conceptual diagram illustrating examples of temporal neighboring motion vector candidates for merge/skip modes.

In the derivation of TMVP per HEVC, as depicted in FIG. 4B, a scaled motion vector for current block 158 is derived based on a co-located PU belonging to one of the reference pictures of a current picture within the signaled reference picture list. The reference picture list to be used for derivation of the co-located PU is explicitly signaled in the slice header in HEVC. The scaled motion vector for temporal merge candidate is obtained with the scaled motion vector of the co-located PU using the POC distances, tb and td, where tb is defined to be the POC difference between the reference picture of the current picture and the current picture and td is defined to be the POC difference between the reference picture of the co-located picture and the co-located picture, per HEVC. The reference picture index of temporal merge candidate is set equal to zero in HEVC. A practical realization of the scaling process is described in the HEVC draft specification. For a B-slice, two motion vectors, one is for reference picture list 0 and the other is for reference picture list 1, are obtained and combined to make the bi-predictive merge candidate.

FIG. 4B is a conceptual diagram illustrating examples of temporal neighboring motion vector candidates for merge/skip modes. The position of a co-located PU is selected between two candidate positions, C 160B and H 160A, as depicted in FIG. 4B. If PU at position H 160A is not available, or is intra coded, or is outside of the current CTU row, position C 160B is used. Otherwise, position H 160A is used for the derivation of the temporal merge candidate, according to HEVC.

Besides SMVPs and TMVPs, there are two additional types of synthetic merge candidates in HEVC: combined bi-predictive MVP and zero MVP. Combined bi-predictive MVP are generated by utilizing SMVP and TMVP. Combined bi-predictive merge candidate is used for B-Slice only in HEVC. For example, two candidates in the original merge candidate list, which have mvL0 and refIdxL0 or mvL1 and refIdxL1, are used to create a combined bi-predictive merge candidate in HEVC.

In the process of candidate selection per HEVC, duplicated candidates having the same motion parameters as the previous candidate in the processing order are removed from the candidate list. This process is defined in HEVC as the pruning process. Also, candidates inside the same merge estimation region (MER) are not considered in HEVC, in order to help parallel merge processing. Redundant partition shape is avoided in order to not emulate a virtual 2N×2N partition in HEVC.

Between each generation step, the derivation process is stopped if the number of candidates reaches to MaxNumMergeCand. In the current common test condition for HEVC, MaxNumMergeCand is set equal to five. Since the number of candidates is constant for HEVC, an index of the best merge candidate is encoded using truncated unary binarization.

The following describes some additional aspects of motion prediction in HEVC. Several aspects of merge and AMVP modes are described as follows. Other standards and video coding processes can use these or similar processes for motion prediction.

Video encoder 200 and video decoder 300 may perform motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture may be calculated based on Picture Order Count (POC) values of the pictures.

For a motion vector to be predicted, both its associated containing picture and reference picture may be different. Therefore, a new distance (based on POC) may be calculated. And the motion vector may be scaled based on these two POC distances. For a spatial neighboring candidate, the containing pictures for the two motion vectors are the same, while the reference pictures may be different. In HEVC, motion vector scaling applies to both TMVP and AMVP for spatial and temporal neighboring candidates.

Video encoder 200 and video decoder 300 may perform artificial motion vector candidate generation. If a motion vector candidate list is not complete, artificial motion vector candidates may be generated and inserted at the end of the list until the list has a prescribed number of candidates.

In merge mode of HEVC, there are two types of artificial MV candidates: a combined candidate derived only for B-slices and zero candidates used only for AMVP if the first type (combined candidate) does not provide enough artificial candidates.

Per HEVC, for each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may perform a pruning process for candidate insertion. Candidates from different blocks may happen to be the same, which decreases the efficiency of a merge/AMVP candidate list. Per HEVC, a pruning process is applied to solve this problem. According to the pruning process, video encoder 200 and video decoder 300 may compare one candidate against the others in the current candidate list to avoid inserting identical candidates, to a certain extent. To reduce the complexity, only limited numbers of pruning process may be applied, instead of comparing each potential candidate with all the other existing candidates, e.g., per the techniques of this disclosure as described in greater detail below.

Figure 5:
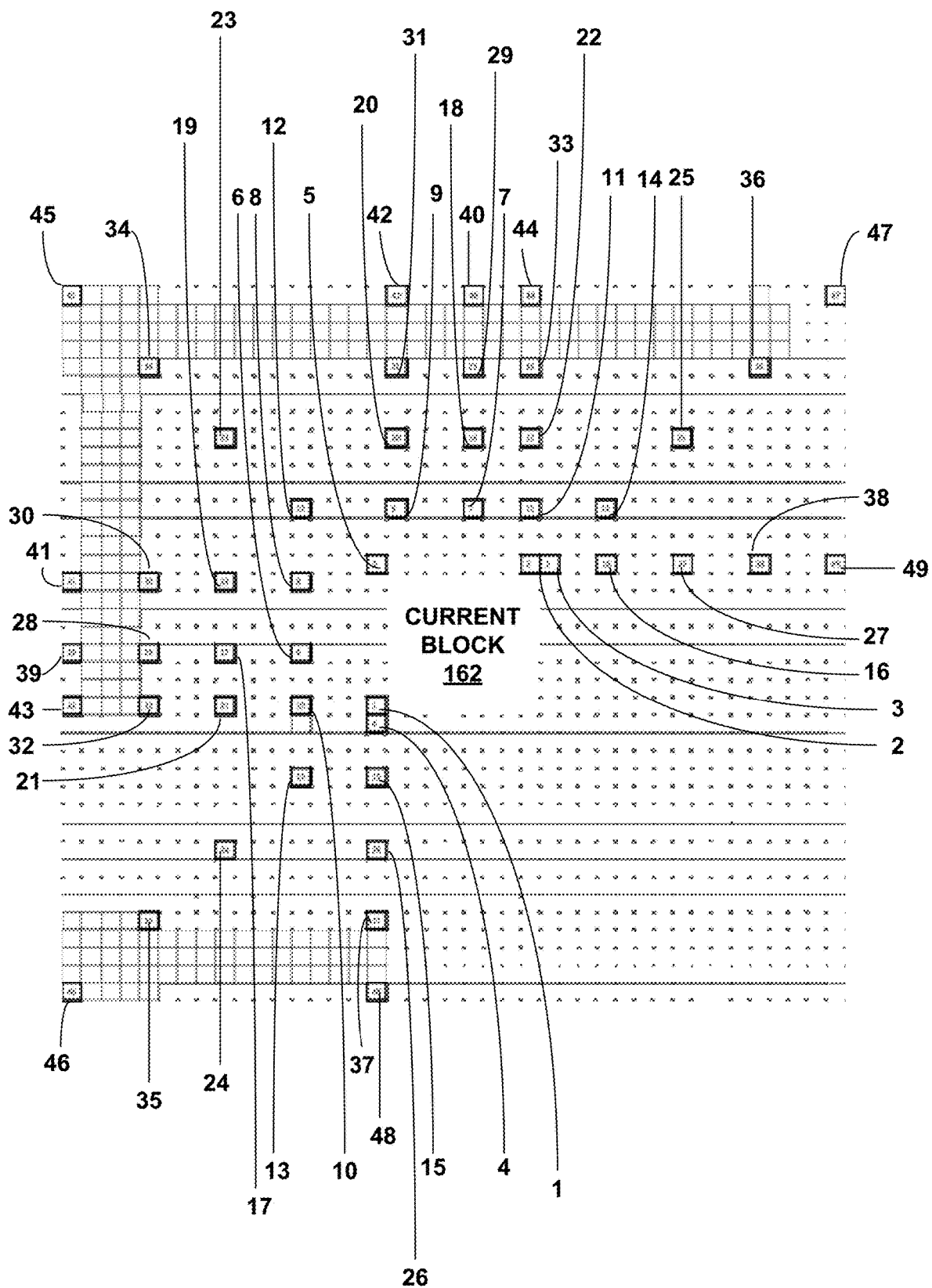
FIG. 5 is a conceptual diagram illustrating examples of spatial neighboring blocks used to derive spatial merge candidates.

FIG. 5 is a conceptual diagram illustrating examples of spatial neighboring blocks used to derive spatial merge candidates. Video encoder 200 and video decoder 300 may use motion information of non-adjacent spatial neighboring candidates to construct a motion vector prediction candidate list for current block 162. A non-adjacent (e.g., a block that does not immediately neighbor the current block) spatial merge candidate prediction technique is proposed for the future video coding standards, such as VVC. Such techniques may increase the size of merge candidate list by filling in the merge candidate list from non-adjacent spatial neighboring blocks. For example, FIG. 5 illustrates examples of non-adjacent spatial neighboring blocks (e.g., blocks that are not immediately neighboring the current block). In FIG. 5, blocks identified as 1-5 are adjacent blocks (e.g., immediately neighboring), and blocks identified as 6-49 are non-adjacent (e.g., not immediately neighboring but proximate) to current block 162.

The neighboring blocks may be grouped as follows. In general, the groups may be based on proximity to the current block. In one example, group 1 includes blocks 1-5; group 2 includes blocks 13, 10, 6, 8, 12, 9, 7, 11, 14, and 16; group 3 includes blocks 26, 24, 21, 17, 19, 23, 20, 18, 22, 25, and 27; Group 4 includes blocks 37, 35, 32, 28, 30, 34, 31, 29, 33, 36, and 38; and Group 5 includes blocks 48, 46, 43, 39, 41, 45, 42, 40, 44, 47, and 49.

This disclosure recognizes that some video coding approaches may encounter the following problems. An increase in the motion vector predictors in inter prediction can improve coding efficiency. However, a pruning process may be necessary in order to avoid adding the same candidates multiple times (e.g., adding the same motion vector predictors). For example, when the list, such as motion vector predictor list, increases in size, more and more pruning operations may be needed, which increases the complexity of video encoder 200 and video decoder 300 (e.g., video encoder 200 and video decoder 300 may need to expend more clock cycles to perform the pruning operation, thereby slowing down encoding and decoding).

Additionally, this disclosure recognizes that, as the size of a motion vector predictor list increases, more and more pruning operations are used, which increases the complexity of video encoders and video decoders. The pruning operation may include comparing an existing candidate with a new candidate and, if they are the same, the new candidate is not added to the motion vector predictor list.

In accordance with the techniques of this disclosure, a video coder (e.g., video encoder 200 or video decoder 300) may generate motion vector predictors from the neighboring blocks of current block 162 (e.g., immediately neighboring and non-immediately neighboring blocks) and corresponding temporal blocks. The video coder may perform one or more example techniques of fast pruning algorithms to reduce the complexity of constructing the motion vector predictor list. The video coder may perform the example techniques in merge candidate list generation or in the field of other motion vector predictor list generation, such as for AMVP list generation and affine MVP list generation.

Additionally or alternatively, the video coder may be configured according to the techniques of this disclosure to generate motion vector predictors from neighboring blocks and corresponding temporal blocks. These example techniques may reduce the complexity of motion vector predictor list generation through a fast pruning algorithm. These example techniques can be used in merge candidate list generation, and also can be used in the field of other motion vector predictor list generation such as AMVP list generation and affine MVP list generation.

Figure 6:
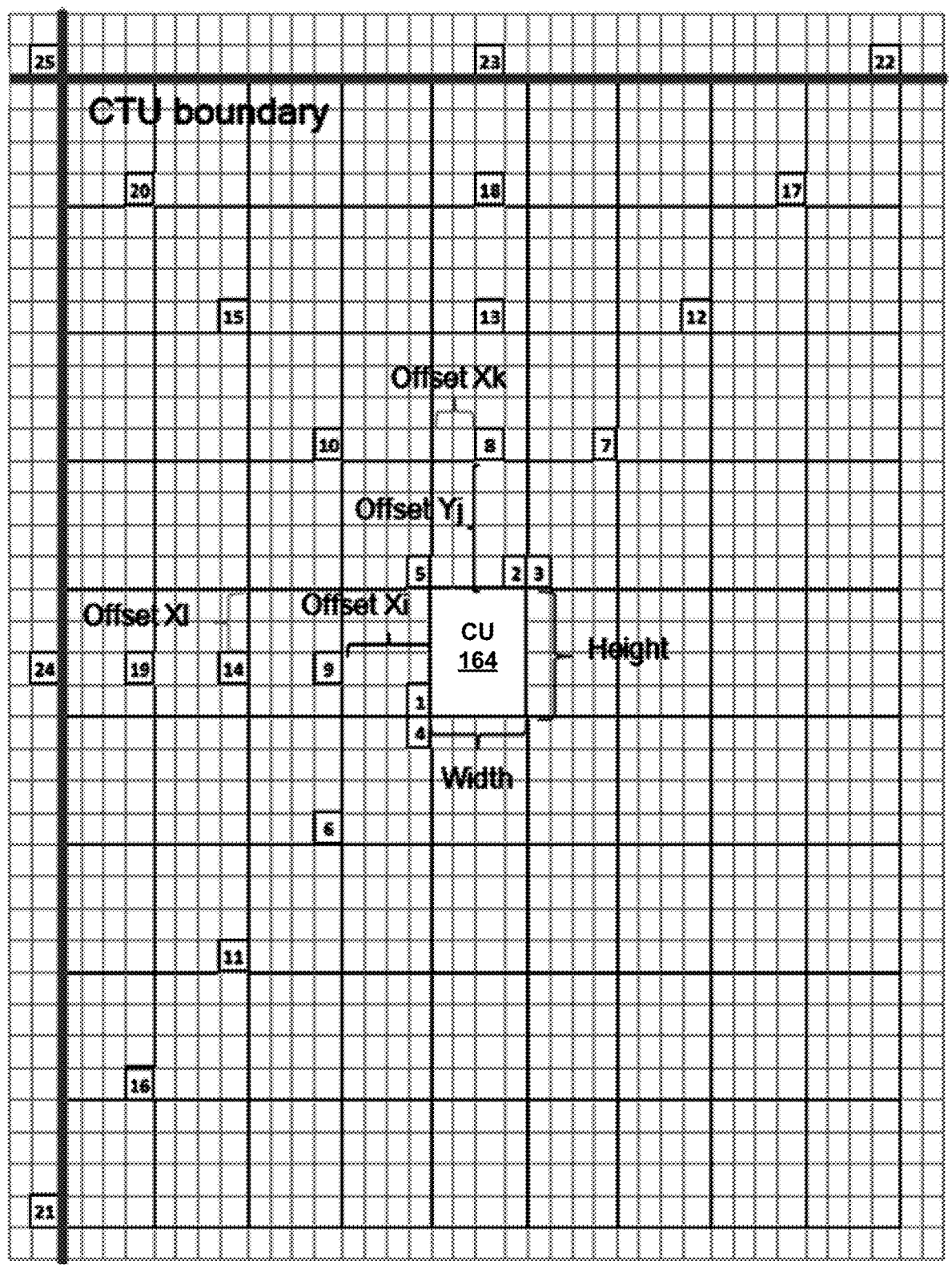
FIG. 6 is a conceptual diagram illustrating additional examples of spatial neighboring blocks used to derive spatial merge candidates.

FIG. 6 is a conceptual diagram illustrating additional examples of spatial neighboring blocks used to derive spatial merge candidates. In FIG. 6, the size of current CU 164 is Width×Height. The numbered blocks illustrate the locations of candidate spatial neighboring blocks that may be used to derive the spatial merge candidates. The distance between CU 164 and a motion vector predictor candidate is Offset_X in the horizontal direction and Offset_Y in the vertical direction. Offset_X and Offset_Y can be fixed values or dependent on the size of CU 164. Offset_X and Offset_Y can be specified in both decoder side and encoder side, or transmitted in parameter sets (VPS, SPS, PPS, or the like).

The video coder (video encoder 200 or video decoder 300) may construct the candidate list (e.g., motion vector predictor list) by checking the numbered blocks in the ascending order of the numbers. The order shown in FIG. 6 is one example. The order can be specified in both decoder side and encoder side, or transmitted in parameter sets.

If a block is inter-prediction coded, the video coder may fetch and store motion information from the block and use this motion information as a potential candidate for CU 164. The video coder may perform a pruning process by comparing the potential candidate with the existing candidates. A potential candidate may be pruned (e.g., the insertion of the candidate in the motion vector predictor list is bypassed) if the video coder determines that an existing candidate has the same motion information. The video coder may insert the potential candidate into the candidate list (e.g., motion vector predictor list) if the video coder does not prune the potential candidate. The candidate list (e.g., motion vector predictor list) construction process may terminate when the number of candidates reaches a predefined maximum number.

As one example, assume the size of the candidate list (e.g., motion vector predictor list) is 10, and the number of potential motion vector predictor candidates is 25. The video coder may perform the following process, which the video coder may terminate when the number of candidates in the list reaches 10.

1. The positions of the motion vector predictors may be reliant on the size of CU 164. For example, in FIG. 6, the offset_xi is equal to CU Width, and offset_yj is equal to CU Height. In the example of FIG. 6, offset_Xk is equal to CU Width>>1 (½ width), and offset_Yl is equal to CU Height>>1 (½ height).
2. Check the first group of potential candidates of blocks 1, 2, 3, 4, and 5. If motion information is available, add the motion information into the motion vector predictor list. When checking a candidate from the second group, perform pruning by comparing the motion information from the second group with the candidates already in the motion vector predictor list.
3. Check the second group of potential candidates from blocks 6 to 10. When checking a candidate from the second group, perform pruning by comparing the motion information with the candidates already in the motion vector predictor list.
4. In order to restrict the number of pruning, define a max number of pruning operation as MaxPruningNum; if the number of pruning operations reaches MaxPruningNum, do not prune anymore.
5. Repeat adding candidates until the number of candidates in the list reaches 10 or all of the potential candidates have been checked.

In this manner, blocks 1-5 represent an example of a first set of blocks that immediately neighbor a current block, and blocks 6-25 (or any subset thereof) may represent an example of a second set of blocks that are separated from the current block by one or more blocks. According to the techniques of this disclosure, a video coder, such as video encoder 200 or video decoder 300, may determine motion vectors for the first set of blocks (e.g., blocks 1-5), and then determine a motion vector for a block of the second set of blocks (e.g., block 9 of blocks 6-25). The video coder may add the motion vectors of blocks 1-5 (the first set of blocks) to a motion vector predictor list. The video coder may determine whether the motion vector of, e.g., block 9 is the same as the motion vector of any of blocks 1-5. If the motion vector of block 9 is not the same as the motion vectors of blocks 1-5, the video coder may add the motion vector of block 9 to the motion vector prediction list; otherwise, the video coder may bypass adding the motion vector to the motion vector prediction list. Although each of blocks 1-5 is discussed in this example, it should be understood that the video coder may compare the motion vector to any subset of the first set of blocks, e.g., only blocks 1,2, and 5, for example.

Additionally, the video coder may determine whether a second motion vector of the second set of blocks (e.g., block 8 of blocks 6-25) is the same as any of the motion vectors of the first set of blocks or the motion vector of block 9, continuing the example above. If the second motion vector is not the same as the motion vector for block 9 of the second set of blocks and not the same as any motion vector of any block of the first set of blocks, the video coder may insert the second motion vector as a motion vector predictor in the motion vector predictor list. Otherwise, if the second motion vector is the same as the motion vector for block 9 of the second set of blocks or is the same as a motion vector of any of the first set of blocks, the video coder may bypass inserting the second motion vector as a motion vector predictor in the motion vector predictor list.

In an alternative example, the video coder may perform a technique to restrict the number of pruning operations. For example, the video coder may perform pruning with the closest neighbor candidates to a candidate which has already been added into the motion vector candidate list. For example, when checking the candidate at block 4, the closest neighboring candidate is the candidate at block 9.

In another alternative example, the video coder may perform a pruning operation by comparing the current candidate with the first N available candidates in the candidate list. N can be specified in both encoder side and decoder side or transmitted in parameter sets.

In another alternative example, the video coder may perform full pruning between the candidates.

In another alternative example, the size of the candidates list can be N, and the number of potential motion vector candidates can be M. N and M can be pre-specified in both video encoder 200 and video decoder 300, or video encoder 200 may encode data representing N and M in parameter sets (e.g., a video parameter set (VPS), a sequence parameter set (SPS), a picture parameter set (PPS)) or in other data sets, such as a slice header, a block (e.g., CTU) header, or the like.

In this example, the pruning operation can be done through comparing the reference direction, and/or reference index, and/or POC, and/or motion vector (with/without scaling) between two motion vector predictors. If the motion vector predictor is the same as one in the list, the video coder (video encoder 200 or video decoder 300) may avoid adding the motion vector predictor into the list.

Video encoder 200 and video decoder 300 may be configured to perform a count based pruning algorithm for pruning candidates from a motion vector prediction candidate list. Video encoder 200 and video decoder 300 may be configured with a maximum number of pruning operations allowed during motion vector predictor list generation. For example, video encoder 200 may determine the maximum number and code (e.g., signal) the maximum number in a parameter set, slice header, block header, or the like. Alternatively, video encoder 200 and video decoder 300 may be pre-configured with the maximum number. When the number of pruning operations has reached the maximum number, video encoder 200 and video decoder 300 may prevent further pruning operations.

In one example, if the number of pruning reaches the maximum allowed number, video encoder 200 and video decoder 300 may add the new potential candidates to the list without pruning. In another example, if the number of pruning operations reaches the maximum allowed number, the new potential candidates will not be added in the list. Video encoder 200 and video decoder 300 may add the default candidates in the list. For example, video encoder 200 and video decoder 300 may add combined candidates (as in the HEVC method) in the list if the maximum allowed number has not been reached.

Examples of pruning operations described herein may be performed by video encoder 200 and video decoder 300. The examples may be performed separately or in any combination.

In one example, the comparing order is according to the order of candidates in the list. Let N represent the number of candidates, indexed from 1 to N, in the motion vector predictor list. When checking a new candidate, video encoder 200 and video decoder 300 may compare the new candidate with the first candidate in the list, at first. If the new candidate is different from candidate 1, then video encoder 200 and video decoder 300 may compare the new candidate with candidate 2. The comparing order is from candidate 1 to candidate N. If the potential candidate is same as the candidate in the list, then do not add it in the list. Video encoder 200 and video decoder 300 may perform pruning until the number of pruning operations reaches the max allowed pruning number or after having compared the new candidate with all N candidates in the list.

In one example, the comparing order is according to an inverted order of the candidates in the list. Let N represent the number of candidates, indexed from 1 to N, in the motion vector predictor list. When checking a new candidate, video encoder 200 and video decoder 300 may compare the new candidate with the latest candidate added in the list at first (i.e., starting at candidate N). If the new candidate is different from candidate N, then video encoder 200 and video decoder 300 may compare the new candidate with candidate N−1. The comparing order is from candidate N to candidate 1. If the new candidate is the same as any candidate in the list, then video encoder 200 and video decoder 300 may not add the new candidate to the list. Video encoder 200 and video decoder 300 may perform pruning until the number of pruning operations reaches the max allowed pruning number or the potential candidate has been compared with all the candidates in the list.

In one example, the comparing order is determined according to the distance between the new candidate and the candidates in the list. According to the position of the candidates in the list, video encoder 200 and video decoder 300 may calculate a list of candidates to be checked, arranged in an order for comparison with the new candidate. The order may be defined according to distances between the new candidate and the candidates in the list Video encoder 200 and video decoder 300 may compare the new candidate with the first nearest candidate in the list, then compare the new candidate with the second nearest candidates in the list, and continue until the number of pruning operations reaches the maximum allowed pruning number or the potential candidate has been compared with all the candidates in the list.

In one example, the maximum number of pruning operations can be set to a fixed number specified in both video encoder 200 and video decoder 300. In some examples, the maximum number can be set according to the current block size. In some examples, the maximum number can be set according to the maximum allowed coding block size. In some examples, the maximum number can be set according to the minimum allowed coding block size.

In one example, the maximum number of pruning operations can be set as a value signaled from video encoder 200 to video decoder 300 at the sequence level, picture level, slice level, or block level. For example, this value can be signaled in the Sequence Parameter Set (SPS), Picture Parameter Set (PPS), Slice header (SH), Coding Tree Unit (CTU) or Coding Unit (CU).

In one example, the comparing order can be specified in both video encoder 200 and video decoder 300. In one example, the pruning order (comparing order) can be set as a value signaled from video encoder 200 to video decoder 300 at the sequence level, picture level, slice level, or block level. For example, this value can be signaled in the Sequence Parameter Set (SPS), Picture Parameter Set (PPS), Slice header (SH), Coding Tree Unit (CTU) or Coding Unit (CU).

Figure 7:
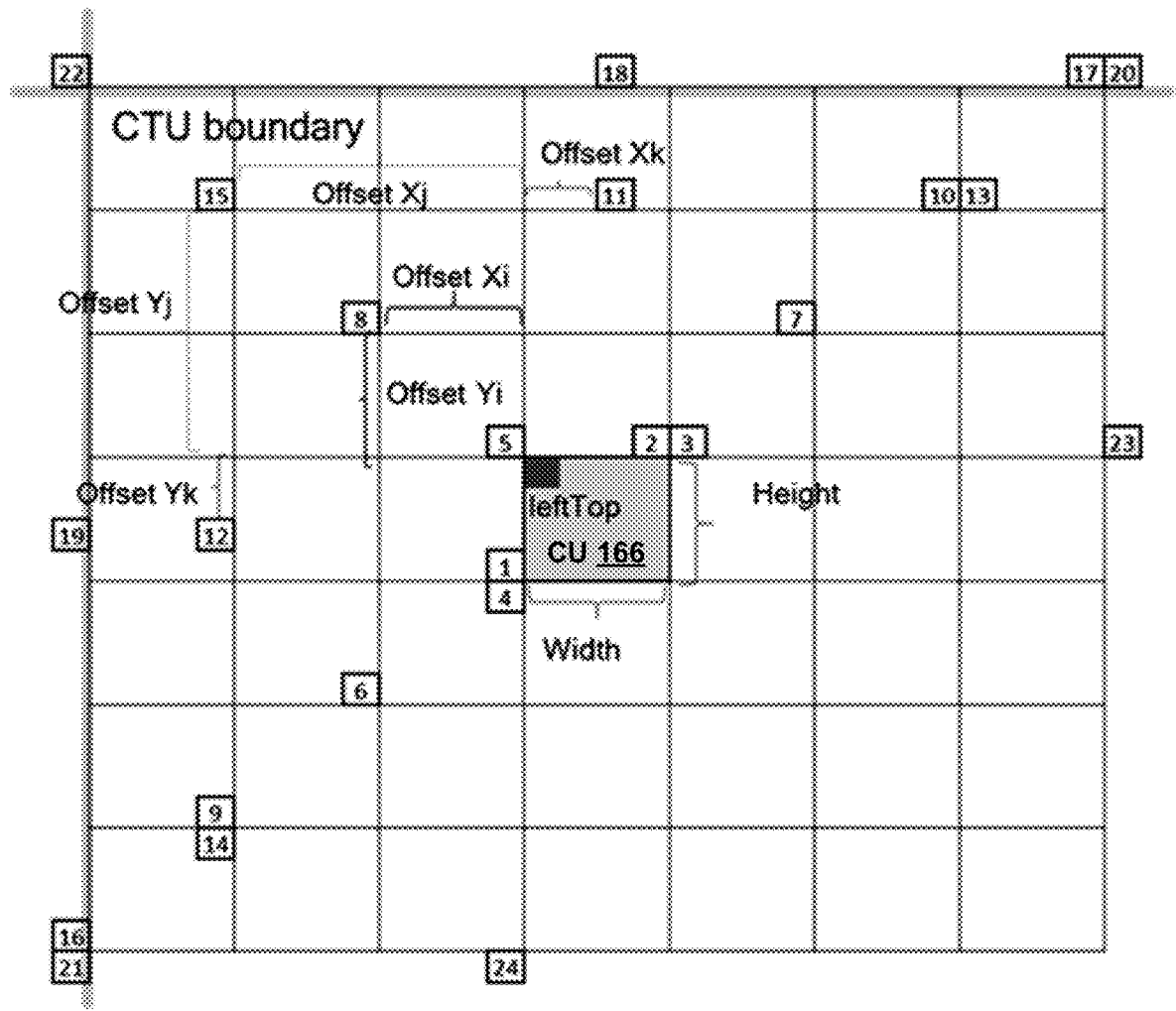
FIG. 7 is a conceptual diagram illustrating an example set of spatial neighboring blocks that may be used to derive spatial merge candidates in accordance with the techniques of this disclosure.

FIG. 7 is a conceptual diagram illustrating an example set of spatial neighboring blocks that may be used to derive spatial merge candidates in accordance with the techniques of this disclosure. FIG. 7 shows an example of a candidate pattern neighboring CU 166.

1. The number of positions of motion vector candidates to be checked in each round (group) may be different. The number of candidates in each round and the number of rounds can be specified in both encoder side and decoder side, or transmitted in a parameter set.
2. The distance between two consecutive groups may be different. The positions of candidates may depend on the size of CU 166 or based on fixed values.
3. As shown in the example of FIG. 7, the positions in the first group are the same as in HEVC, i.e. including positions 1, 2, 3, 4 and 5. The number of positions in each group following the first group may increase as the distance from CU 166 increases. In the example of FIG. 7, the second group includes positions 7, 8 and 9; the third group includes positions from 9 to 15; and the fourth group includes positions from 16 to 23.

For example, as shown in FIG. 7, the size of CU 166 is CU.width and CU.height, and the left top position of CU 166 is leftTop( ). For example, the position of candidates 5 is defined as leftTop.offset(−1, −1). Let the position of leftTop be (x, y), and thus, the notation "leftTop.offset(−1, −1)" means (x−1, y−1). The position of the potential candidates can be defined as below:
a. For candidates 1 to 5, the positions are the same as defined in HEVC;
b. For candidates 6 to 8:
offsetX=CU.width, offsetY=CU.height
candPos6=leftTop.offset(−offsetX−1, CU.height+offset−1)
candPos7=leftTop.offset(CU.width+offsetX−1, −offsetY−1)
candPos8=leftTop.offset(−offsetX−1, −offsetY−1)
c. For candidates 9 to 15
offsetX=CU.width×2, offsetY=CU.height×2
candPos9=leftTop.offset(−offsetX−1, CU.height+offset−1)
candPos10=leftTop.offset(CU.width+offsetX−1, −offsetY−1)
candPos11=leftTop.offset(CU.width>>1, −offsetY−1)
candPos12=leftTop.offset(−offsetX−1, CU.height>>1)
candPos13=leftTop.offset(CU.width+offsetX, −offsetY−1)
candPos14=leftTop.offset(−offsetX−1, CU.height+offset)
candPos15=leftTop.offset(−offsetX−1, −offsetY−1)
d. For candidates 16 to 24
offsetX=CU.width×3, offsetY=CU.height×3
candPos16=leftTop.offset(−offsetX−1, CU.height+offset−1)
candPos17=leftTop.offset(CU.width+offsetX−1, −offsetY−1)
candPos18=leftTop.offset(CU.width>>1, −offsetY−1)
candPos19=leftTop.offset(−offsetX−1, CU.height>>1)
candPos20=leftTop.offset(CU.width+offsetX, −offsetY−1)
candPos21=leftTop.offset(−offsetX−1, CU.height+offset)
candPos22=leftTop.offset(−offsetX−1, −offsetY−1)
candPos23=leftTop.offset(CU.width+offsetX, −1)
candPos24=leftTop.offset(−1, CU.height+offset)

4. The numbers in the blocks to be checked as shown in FIG. 7 is an example of checking order. The checking order may be changed in other examples. The checking order can be specified in both encoder and decoder sides, or transmitted in parameter sets.
5. In another example, the number of positions in a group decreases as the distance from CU 166 increases. That is the selected positions may be dense when near CU 166 and sparse when far away from CU 166.

In some examples, spatial-temporal motion vectors predictors (STMVP) can be generated from spatial neighing blocks and corresponding temporal block. The STMVP may be generated by averaging 3 candidates, which may include 2 spatial candidates and 1 temporal candidates. If one of these candidates is not available, then the STMVP may be generated by averaging the 2 available candidates.

For example, video encoder 200 and video decoder 300 may average the motion vectors of candidates 3 and 4 from the first group and a temporal motion vector predictor (TMVP) to generate STMVP1. Video encoder 200 and video decoder 300 may average the motion vectors of candidates 6 and candidate 7 from the second group and the TMVP to generate STMVP2. Video encoder 200 and video decoder 300 may average the motion vectors of candidate 11 and candidate 12 from the third group and the TMVP to generate STMVP3, and so on.

Video encoder 200 and video decoder 300 may add the STMVP as the leading candidates in the second and third groups. That is, video encoder 200 and video decoder 300 may add STMVP1 and STMVP2 before the second group candidates. Video encoder 200 and video decoder 300 may add STMVP3 before the third group candidates.

Video encoder 200 and video decoder 300 may perform pruning between STMVP and the candidates in the list. The pruning algorithm may be restricted as discussed above with respect to FIG. 6. Based on the examples, candidates 23, 24, and the TMVP can be used to generate STMVP.

In some examples, video encoder 200 and video decoder 300 may derive STMVP1 by averaging the following 2 or 3 candidates: 1) the first available candidate of candidate 3 and candidate 2, 2) the first available candidate of candidate 4 and candidate 1, 3) the TMVP.

In some examples, video encoder 200 and video decoder 300 may derive STMVP1 by averaging the following 2 or 3 candidates: 1) candidate 3, if candidate 3 is not available, then use candidate 2, 2) candidate 4, if candidate 4 is not available, then use candidate 1, 3) the TMVP.

In an alternative of the example of FIG. 7 as discussed above, video encoder 200 and video decoder 300 may generate STMVP candidates from other candidates, for example, using candidates 9, 8, and the TMVP, or using candidates 9, 7, and the TMVP, or using candidates 6, 8, and the TMVP to generate STMV. In another alternative, video encoder 200 and video decoder 300 may generate the STMVP candidates from candidates in different groups with the TMVP. In another alternative, video encoder 200 and video decoder 300 may add the STMVP candidates at the end of each group or another position in the list. The order of STMVP candidates in the list can be specified in both decoder side and encoder side, or transmitted in parameter set.

In some examples, video encoder 200 and video decoder 300 may generate the STMVP from the candidates have been added in the predictor list. Video encoder 200 and video decoder 300 may average the motion vector of any two spatial candidates in the list and the TMVP to generate the STMVP.

In the above examples, it may be possible to restrict which neighboring blocks are considered. For example, a line buffer restriction can be applied to reduce buffer consumption. The potential spatial candidates may be restricted to be within the current CTU and its line buffer. That is, video encoder 200 and video decoder 300 may use only spatial candidates within the current CTU and its line buffer as potential candidates. As shown in FIG. 6 and the function below:

$$\text{offsetYUpperCTURow} = ((\text{posLT.y} \gg \text{log2MaxCodingBlockSize}) \ll \text{log2MaxCodingBlockSize}) - \text{minPUSize} - \text{posLT.y}$$

$$\text{offsetXLeftCTUColumn} = ((\text{posLT.x} \gg \text{log2MaxCodingBlockSize}) \ll \text{log2MaxCodingBlockSize}) - \text{minPUSize} - \text{posLT.x}$$

```
offsetY = offsetY
    < offsetUpperCTURow? offsetUpperCTURow: offsetY
offsetX = offsetX
    < offsetLeftCTURow? offsetLeftCTURow: offsetX
```

The following describes how parameters may be coded. For example, the number of groups, the number of candidates in each group, the number of candidates for pruning in the group, and the maximum number of pruning operations and the positions of the motion vector candidates can be predefined, fixed or depend on CTU size, the current coding block size, the position of the candidates, and/or the prediction mode. The number of groups, the number of candidates in different groups, the number of candidates for pruning in the group, and the maximum number of pruning operations and the positions of the motion vector candidates may be signaled via the SPS, PPS, or the slice header, or at the CU level.

Additionally or alternatively, video encoder 200 and video decoder 300 may be configured to use the example candidate pattern below. In these examples, video encoder 200 and video decoder 300 may be configured with a defined maximum number of pruning operations. For example, video encoder 200 may signal a determined maximum number of pruning operations, e.g., in a sequence parameter set (SPS), picture parameter set (PPS), video parameter set (VPS), slice header, block header, or the like. Additionally or alternatively, video encoder 200 and video decoder 300 may be preconfigured with the maximum number of pruning operations.

1. The candidates of 1 to 5 are HEVC candidates and used in VVC. Video encoder 200 and video decoder 300 may check the candidates 1 to 5, sub-PU candidates (such as ATMVP), STMVP (sub-PU based or non-PU based), and TMVP. Video encoder 200 and video decoder 300 may count the number of pruning operations. If the number of pruning operations reaches the maximum number, video encoder 200 and video decoder 300 may avoid adding candidates to the list.
2. Video encoder 200 and video decoder 300 may Check the non-adjacent candidates 6 to 23. If the number of pruning operations reaches the maximum number, video encoder 200 and video decoder 300 may avoid adding the candidate in the list.
3. If the number of candidates in the list does not reach the defined predictor list size, video encoder 200 and video decoder 300 may add the combination candidates and/or default candidates in the list.

In some examples, video encoder 200 and video decoder 300 may be configured to prune according to the merge list adding order using the following pattern.
1. The candidates of 1 to 5 are HEVC candidates and used in VVC. Video encoder 200 and video decoder 300 may check the candidates 1 to 5, sub-PU candidates (such as ATMVP), STMVP (sub-PU base or non-PU based), and TMVP. Video encoder 200 and video decoder 300 may count the number of pruning operations. If the number of pruning operations reaches the maximum number, video encoder 200 and video decoder 300 may avoid adding the candidate to the list.
2. Video encoder 200 and video decoder 300 may check the non-adjacent candidates 6 to 24. If the number of pruning operations reaches the maximum number, video encoder 200 and video decoder 300 may avoid adding the candidate in the list.
3. If the number of candidates in the motion vector prediction list does not reach the defined predictor list size, video encoder 200 and video decoder 300 may add the combination candidates and/or default candidates to the list.

As another example, similar to the above examples, video encoder 200 and video decoder 300 may check the candidates according the checking order. When checking a potential candidate, video encoder 200 and video decoder 300 may compare the potential candidate with the candidates already in the list. The comparing order may be according to distance. In this example, as shown in FIG. 6, let the CU width, CU height, offset_Xi, and offset_Y be the same, and use function 1 below to calculate distance. In this example, the comparing order for candidate 7 is candidates {3, 2, 5, 1, 4, 6}. Video encoder 200 and video decoder 300 may compare the potential candidate with the nearest candidate first. For example, when checking candidate 7, video encoder 200 and video decoder 300 may compare candidate 7 with candidate 3 at first (if candidate 3 is available and added in the predictor list), then video encoder 200 and video decoder 300 may compare candidate 7 with the next nearest candidate.

Video encoder 200 and video decoder 300 may calculate the distance as a function of the positions of the candidates. As shown in the functions below, let the position of the candidate be defined as candidate (x, y):

$$\text{Distance} = (x_{candidate\_A} - x_{candidate\_B})^2 + (x_{candidate\_A} - x_{candidate\_B})^2 \quad (1)$$

or $$\text{Distance} = |x_{candidate\_A} - x_{candidate\_B}| + |x_{candidate\_A} - x_{candidate\_B}| \quad (2),$$

per above example.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 8:
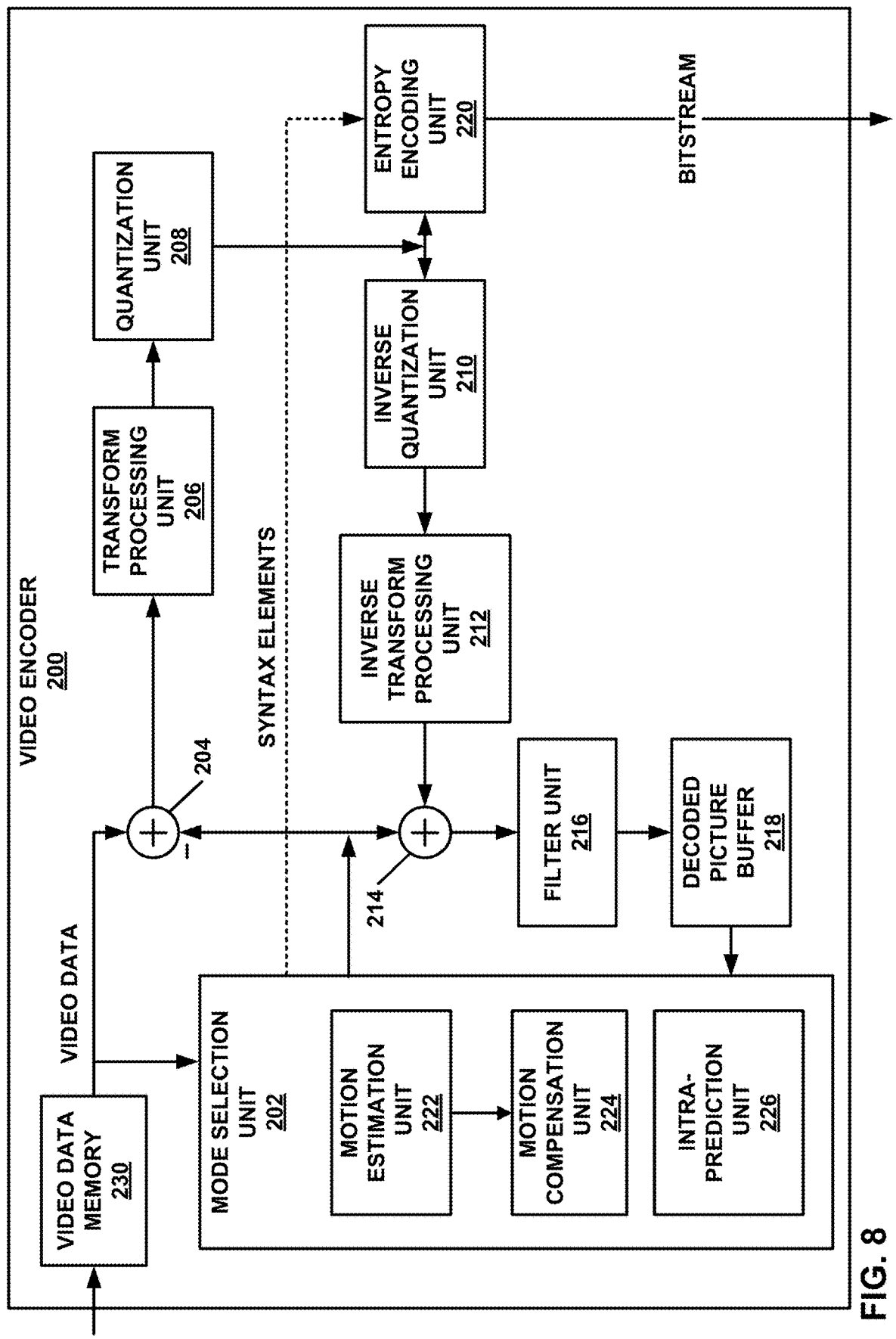
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 224 are not needed, reconstruction unit 214 may store reconstructed blocks to DPB 218. In examples where operations of filter unit 224 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to construct a motion vector predictor list for a current block, and inter-prediction encode the current block based on the motion vector predictor list.

To construct the motion vector predictor list, video encoder 200 may be configured to determine motion vectors for blocks of a first set of blocks, determine a first motion vector for a first block of a second set of blocks, determine a second motion vector for a second block of the second set of blocks and determine whether the second motion vector is the same as the first motion vector for the first block of the second set of blocks or the same as a motion vector of a block from a subset of blocks of the first set of blocks. Video encoder 200 may be configured to, one of, based on the determination that the second motion vector is not the same as the first motion vector for the first block of the second set of blocks and not the same as any motion vector of any block from the subset of blocks of the first set of blocks, insert the second motion vector as a motion vector predictor in the motion vector predictor list, or based on the determination that the second motion vector is the same as the first motion vector for the first block of the second set of blocks or is the same as a motion vector of any block from the subset of blocks of the first set of blocks, bypass inserting (e.g., not insert or avoid inserting) the second motion vector as a motion vector predictor in the motion vector predictor list.

Additionally or alternatively, to construct the motion vector predictor list, video encoder 200 may be configured to, in response to determining that a maximum number of pruning operations have not been performed as part of adding motion vector candidates into the motion vector predictor list: identify a first motion vector candidate, determine whether there are duplicate motion vector candidates to the first motion vector candidate as part of a pruning operation based on the determination that the maximum number of pruning operations have not been performed, determine that the maximum number of pruning operations have been performed as part of adding motion vector candidates into the motion vector predictor list, and bypass (e.g., avoid) a determination of whether there are duplicate motion vector candidates for one or more subsequent motion vector candidates that are added to the motion vector predictor list.

In some examples, to inter-prediction encode the current block, video encoder 200 may determine a prediction block. The prediction block is identified by a motion vector for the current block, and the motion vector for the current block is derivable by video decoder 300 based on a motion vector predictor identified in the motion vector predictor list. Video encoder 200 may determine an index into the motion vector predictor list that identifies the motion vector predictor, determine a residual block based on a difference between the prediction block and the current block and signal information indicative of the residual block and the index into the motion vector predictor list.

Video encoder 200 further represents an example of a device for coding (namely encoding) a current block of video data that includes a memory configured to store video data; and one or more processors implemented in circuitry and configured to: construct a motion vector predictor list for a current block of the video data, wherein to construct the motion vector predictor list, the one or more processors are configured to: determine motion vectors for blocks of a first set of blocks, the first set of blocks comprising blocks that immediately neighbor the current block; determine a first motion vector for a first block of a second set of blocks, the second set of blocks comprising blocks that are separated from the current block by one or more blocks; determine a second motion vector for a second block of the second set of blocks; determine whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list; inter-prediction code the current block using a motion vector for the current block; and code the motion vector using the motion vector predictor list.

Figure 9:
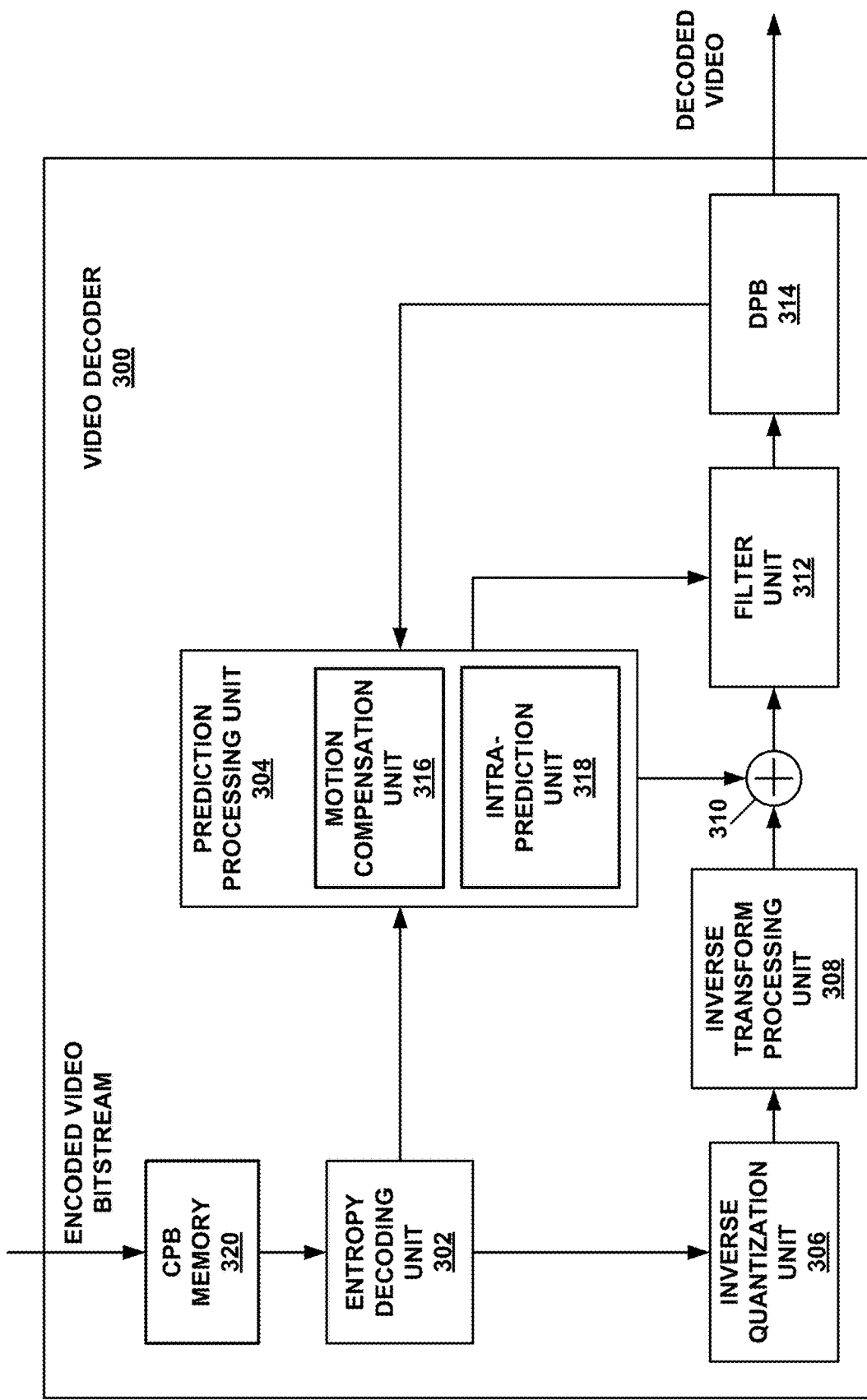
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 9 are illustrated to assist with understanding the operations performed by video decoder 300. The units may be implemented as fixed-function circuits, programmable circuits, or a combination thereof. As discussed with respect to FIG. 8, fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to construct a motion vector predictor list for a current block, and inter-prediction decode the current block based on the motion vector predictor list. To construct the motion vector predictor list, video decoder 300 may determine motion vectors for blocks of a first set of blocks, determine a first motion vector for a first block of a second set of blocks, determine a second motion vector for a second block of the second set of blocks, and determine whether the second motion vector is the same as the first motion vector for the first block of the second set of blocks or the same as a motion vector of a block from a subset of blocks of the first set of blocks. Video decoder 300 may be configured to, one of based on the determination that the second motion vector is not the same as the first motion vector for the first block of the second set of blocks and not the same as any motion vector of any block from the subset of blocks of the first set of blocks, insert the second motion vector as a motion vector predictor in the motion vector predictor list, or based on the determination that the second motion vector is the same as the first motion vector for the first block of the second set of blocks or is the same as a motion vector of any block from the subset of blocks of the first set of blocks, bypassing insert (e.g., not insert or avoid inserting) the second motion vector as a motion vector predictor in the motion vector predictor list.

Additionally or alternatively, to construct the motion vector predictor list, to construct the motion vector predictor list, video decoder 300 may be configured to determine that a maximum number of pruning operations have not been performed as part of adding motion vector candidates into the motion vector predictor list, identify a first motion vector candidate, determine whether there are duplicate motion vector candidates to the first motion vector candidate as part of a pruning operation based on the determination that the maximum number of pruning operations have not been performed, determine that the maximum number of pruning operations have been performed as part of adding motion vector candidates into the motion vector predictor list, and bypass (e.g., avoid) a determination of whether there are duplicate motion vector candidates for one or more subsequent motion vector candidates that are added to the motion vector predictor list.

In some examples, to inter-prediction decode, video decoder 300 may be configured to receive an index into the motion vector predictor list, determine a motion vector predictor based on the index, determine a current motion vector for the current block based on the motion vector predictor; determine a prediction block based on the current motion vector, determine a residual block indicative of differences between the prediction block and the current block, and reconstruct the current block by adding the residual block to the prediction block.

Video decoder 300 further represents an example of a device for coding (namely decoding) a current block of video data that includes a memory configured to store video data; and one or more processors implemented in circuitry and configured to: construct a motion vector predictor list for a current block of the video data, wherein to construct the motion vector predictor list, the one or more processors are configured to: determine motion vectors for blocks of a first set of blocks, the first set of blocks comprising blocks that immediately neighbor the current block; determine a first motion vector for a first block of a second set of blocks, the second set of blocks comprising blocks that are separated from the current block by one or more blocks; determine a second motion vector for a second block of the second set of blocks; determine whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list; inter-prediction code the current block using a motion vector for the current block; and code the motion vector using the motion vector predictor list.

Figure 10:
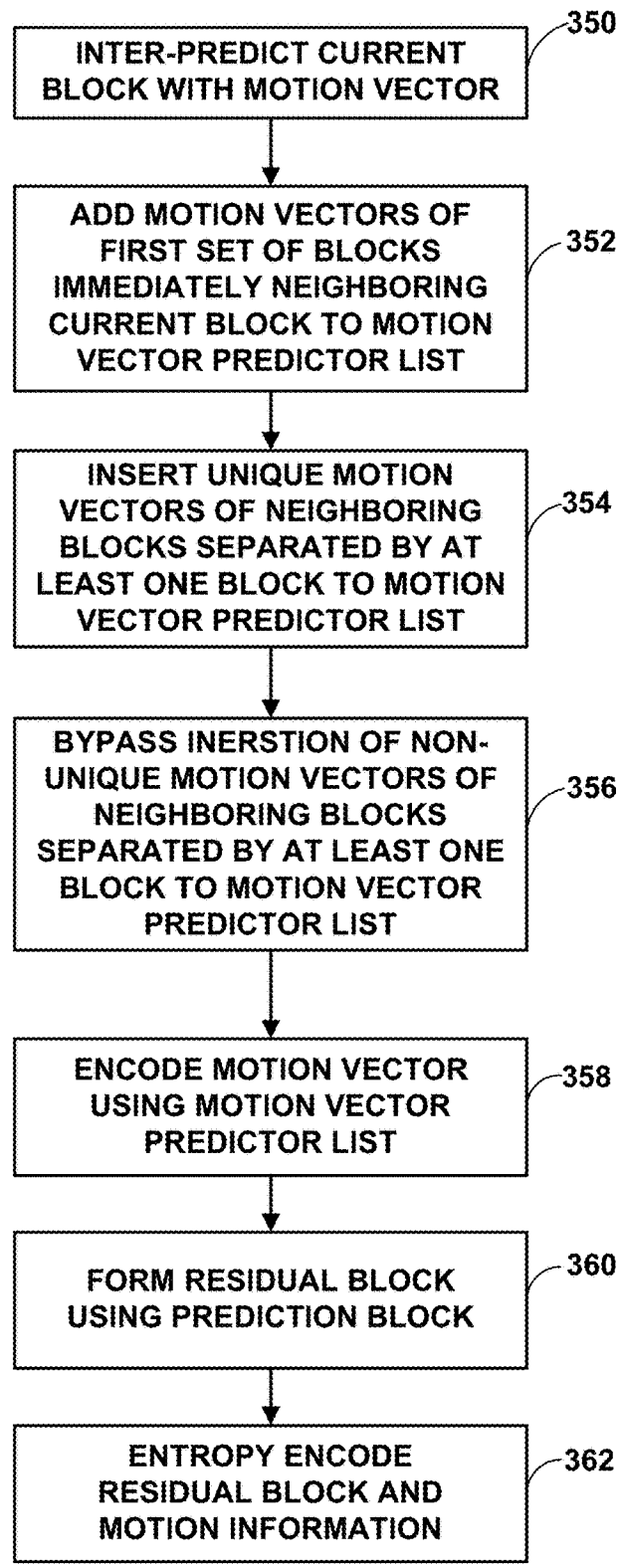
FIG. 10 is a flowchart illustrating an example method of encoding a current block of video data according to the techniques of this disclosure.

FIG. 10 is a flowchart illustrating an example method of encoding a current block of video data according to the techniques of this disclosure. The method of FIG. 10 is explained with respect to video encoder 200, although it should be understood that other video coding devices may be configured to perform the method of FIG. 10.

In this example, video encoder 200 initially inter-predicts a current block of video data with a motion vector (350). For example, video encoder 200 may perform a motion search to determine the motion vector, then generate a prediction block using the motion vector.

Video encoder 200 may encode the motion vector using the techniques of this disclosure, e.g., using a motion vector predictor list (also sometimes referred to as a "motion vector predictor candidate list"). According to these techniques, video encoder 200 may initially add motion vectors of a first set of blocks that immediately neighbor the current block to the motion vector predictor list (352). Video encoder 200 may then insert unique motion vectors of a second set of blocks including neighboring blocks that are separated by at least one block from the current block to the motion vector predictor list (354). Likewise, video encoder 200 may bypass insertion of non-unique motion vectors of the second set of blocks including the neighboring blocks that are separated by at least one block from the current block into the motion vector predictor list (356). Video encoder 200 may generally determine whether a motion vector is "unique" according to whether the motion vector is the same as, or similar to (e.g., within a threshold difference of), a subset of motion vectors of the first set of blocks and/or a subset of motion vectors of the second set of blocks.

Video encoder 200 may then encode the motion vector using the motion vector predictor list (358). For example, in merge mode, video encoder 200 may determine an index that identifies a motion vector predictor in the motion vector predictor list that matches the motion vector used to inter-predict the current block. In AMVP mode, as another example, video encoder 200 may determine an index that identifies a closest matching motion vector predictor in the motion vector predictor list, as well as other motion information such as a reference picture list, a reference picture index, and a motion vector difference.

Video encoder 200 may further form a residual block using the prediction block (360). For example, video encoder 200 may calculate pixel-by-pixel differences between the current block and the prediction block and store these differences in the residual block. Furthermore, video encoder 200 may apply a transform to the residual block to generate a block of transform coefficients, and then quantize the transform coefficients according to a quantization parameter. Video encoder 200 may then entropy encode data representing the residual block (i.e., the quantized transform coefficients) as well as the motion information (362).

In this manner, the method of FIG. 10 represents an example of a method of encoding video data including constructing a motion vector predictor list for a current block of video data, wherein constructing the motion vector predictor list comprises: determining motion vectors for blocks of a first set of blocks, the first set of blocks comprising blocks that immediately neighbor the current block; determining a first motion vector for a first block of a second set of blocks, the second set of blocks comprising blocks that are separated from the current block by one or more blocks; determining a second motion vector for a second block of the second set of blocks; determining whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, inserting the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list; inter-prediction encoding the current block using a motion vector for the current block; and encoding the motion vector using the motion vector predictor list.

Figure 11:
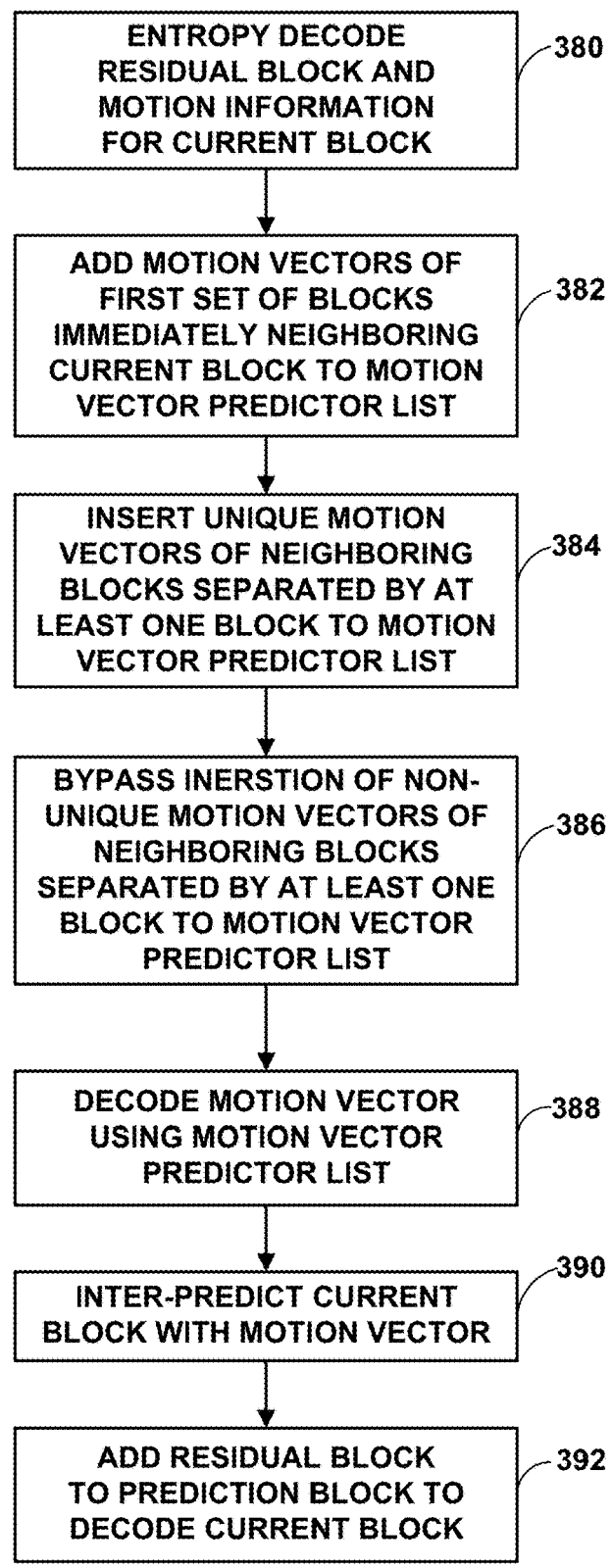
FIG. 11 is a flowchart illustrating an example method of decoding a current block of video data according to the techniques of this disclosure.

FIG. 11 is a flowchart illustrating an example method of decoding a current block of video data according to the techniques of this disclosure. The method of FIG. 11 is explained with respect to video decoder 300, although it should be understood that other video coding devices may be configured to perform the method of FIG. 11.

Video decoder 300 may entropy decode a residual block and motion information for a current block (380). For example, video decoder 300 may entropy decode quantized transform coefficients, then inverse quantize and inverse transform the coefficients to reproduce a residual block for the current block. Video decoder 300 may also entropy decode an index into a motion vector predictor list (and in AMVP mode, other motion information such as a reference picture list, a reference index, and a motion vector difference).

Video decoder 300 may then decode the motion vector using the motion vector predictor list and motion information. According to the techniques of this disclosure, video decoder 300 may initially add motion vectors of a first set of blocks that immediately neighbor the current block to the motion vector predictor list (382). Video decoder 300 may then insert unique motion vectors of a second set of blocks including neighboring blocks that are separated by at least one block from the current block to the motion vector predictor list (384). Likewise, video decoder 300 may bypass insertion of non-unique motion vectors of the second set of blocks including the neighboring blocks that are separated by at least one block from the current block into the motion vector predictor list (386). Video decoder 300 may generally determine whether a motion vector is "unique" according to whether the motion vector is the same as, or similar to (e.g., within a threshold difference of), a subset of motion vectors of the first set of blocks and/or a subset of motion vectors of the second set of blocks.

Video decoder 300 may then decode the motion vector for the current block using the motion vector predictor list (388). In particular, video decoder 300 may determine a motion vector predictor using the decoded index. In merge mode, video decoder 300 may use the motion vector predictor as the motion vector for the current block. In AMVP mode, video decoder 300 may add the motion vector difference to the motion vector predictor to obtain the motion vector.

Video decoder 300 may then inter-predict the current block with the motion vector (390) to produce a prediction block. Video decoder may then add the prediction block to the residual block, on a pixel-by-pixel basis, to decode the current block (392).

In this manner, the method of FIG. 11 represents an example of a method of decoding video data including constructing a motion vector predictor list for a current block of video data, wherein constructing the motion vector predictor list comprises: determining motion vectors for blocks of a first set of blocks, the first set of blocks comprising blocks that immediately neighbor the current block; determining a first motion vector for a first block of a second set of blocks, the second set of blocks comprising blocks that are separated from the current block by one or more blocks; determining a second motion vector for a second block of the second set of blocks; determining whether the second motion vector is the same as the first motion vector for the first block of the second set of blocks or the same as a motion vector of a block from a subset of blocks of the first set of blocks; in response to determining that the second motion vector is not the same as the first motion vector for the first block of the second set of blocks and not the same as any motion vector of any block from the subset of blocks of the first set of blocks, inserting the second motion vector as a motion vector predictor in the motion vector predictor list; in response to determining that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list; inter-prediction decoding the current block using a motion vector for the current block; and decoding the motion vector using the motion vector predictor list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a size of a current block of a picture of video data, the size comprising one of a plurality of possible sizes for blocks of the video data;
   constructing a motion vector predictor list for the current block of the picture of the video data, wherein constructing the motion vector predictor list comprises:
      determining motion vectors for blocks of a first set of blocks, the first set of blocks comprising blocks in the picture that immediately neighbor the current block;
      determining a distance from the current block, the distance being a function of the size of the current block, the distance being at least a minimum size of the plurality of possible sizes for the blocks of the video data;
      determining a first motion vector for a first block of a second set of blocks, the second set of blocks comprising blocks in the picture that are separated from the current block by the determined distance;
      determining a second motion vector for a second block of the second set of blocks;
      determining whether the second motion vector is the same as the first motion vector for the first block of the second set of blocks or the same as a motion vector of a block from a subset of blocks of the first set of blocks; and
      in response to determining that the second motion vector is the same as the first motion vector for the first block of the second set of blocks or is the same as a motion vector of any block from the subset of blocks of the first set of blocks, bypassing inserting the second motion vector as a motion vector predictor in the motion vector predictor list;
   inter-prediction coding the current block using a motion vector for the current block; and
   coding the motion vector using the motion vector predictor list.

2. The method of claim 1, further comprising:
   inserting the determined motion vectors for the first set of blocks in the motion vector prediction list.

3. The method of claim 1, wherein the first block of the second set of blocks is a block that is the spatially closest block to the second block, and a block that was previously checked to determine whether the first motion vector is to be included in the motion vector predictor list.

4. The method of claim 1, further comprising:
   determining a third motion vector for a third block of a third set of blocks;
   determining a fourth motion vector for a fourth block of the third set of blocks;
   determining whether the fourth motion vector is the same as the third motion vector for the third block of the third set of blocks or the same as any motion vector of any block from the subset of blocks of the first set of blocks; and
   in response to determining that the fourth motion vector is the same as the third motion vector for the third block of the third set of blocks or is the same as a motion vector of any block from the subset of blocks of the first set of blocks, bypassing inserting the fourth motion vector as a motion vector predictor in the motion vector predictor list.

5. The method of claim 4, wherein the third block of the third set of blocks is a block that is the spatially closest block to the fourth block, and a block that was previously checked to determine whether the third motion vector is to be included in the motion vector predictor list.

6. The method of claim 1, further comprising, in response to determining that the second motion vector is not the same as the first motion vector for the first block of the second set of blocks and not the same as any motion vector of any block from the subset of blocks of the first set of blocks, inserting the second motion vector as a motion vector predictor in the motion vector predictor list.

7. The method of claim 1, wherein the subset of blocks is limited to a number N of the first set of blocks, N being a positive integer value, the method further comprising coding a value representing N.

8. The method of claim 1, wherein the subset of blocks comprises the full first set of blocks.

9. The method of claim 1, wherein determining whether the second motion vector is the same as the first motion vector comprises comparing, between the first motion vector and the second motion vector, one or more of reference directions, reference indexes, or picture order count (POC) values.

10. The method of claim 1, wherein the method of coding video data comprises a method of decoding video data, wherein inter-prediction coding comprises inter-prediction decoding, and wherein inter-prediction decoding comprises:
    receiving an index into the motion vector predictor list;
    determining a motion vector predictor based on the index;
    determining the motion vector for the current block based on the motion vector predictor;
    determining a prediction block based on the motion vector;
    determining a residual block indicative of differences between the prediction block and the current block; and
    reconstructing the current block by adding the residual block to the prediction block.

11. The method of claim 1, wherein the method of coding video data comprises a method of encoding video data, wherein inter-prediction coding comprises inter-prediction encoding, and wherein inter-prediction encoding comprises:
    determining a prediction block, wherein the prediction block is identified by a motion vector for the current block, wherein the motion vector for the current block is derivable by a video decoder based on a motion vector predictor identified in the motion vector predictor list;
    determining an index into the motion vector predictor list that identifies the motion vector predictor;
    determining a residual block based on a difference between the prediction block and the current block; and
    signaling information indicative of the residual block and the index into the motion vector predictor list.

12. A device for coding video data, the device comprising:
    a memory configured to store video data; and
    one or more processors implemented in circuitry and configured to:
        determine a size of a current block of a picture of the video data, the size comprising one of a plurality of possible sizes for blocks of the video data;
        construct a motion vector predictor list for the current block of the picture of the video data, wherein to construct the motion vector predictor list, the one or more processors are configured to:
            determine motion vectors for blocks of a first set of blocks, the first set of blocks comprising blocks in the picture that immediately neighbor the current block;
            determine a distance from the current block, the distance being a function of the size of the current block, the distance being at least a minimum size of the plurality of possible sizes for the blocks of the video data;
            determine a first motion vector for a first block of a second set of blocks, the second set of blocks comprising blocks in the picture that are separated from the current block by the determined distance;
            determine a second motion vector for a second block of the second set of blocks;
            determine whether the second motion vector is the same as the first motion vector for the first block of the second set of blocks or the same as a motion vector of a block from a subset of blocks of the first set of blocks;
            in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; and
            in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list;
        inter-prediction code the current block using a motion vector for the current block; and
        code the motion vector using the motion vector predictor list.

13. The device of claim 12, wherein the one or more processors are further configured to insert the determined motion vectors for the first set of blocks in the motion vector prediction list.

14. The device of claim 12, wherein the first block of the second set of blocks is a block that is the spatially closest block to the second block, and a block that was previously checked to determine whether the first motion vector is to be included in the motion vector predictor list.

15. The device of claim 12, wherein the subset of blocks is limited to a number N of the first set of blocks, N being a positive integer value, and wherein the one or more processors are further configured to code a value representing N.

16. The device of claim 12, wherein the one or more processors are configured to decode the motion vector and inter-prediction decode the current block.

17. The device of claim 12, wherein the one or more processors are configured to encode the motion vector and inter-prediction encode the current block.

18. The device of claim 12, further comprising a display configured to display decoded video data.

19. The device of claim 12, wherein the device comprises one or more of a camera, a computer, a mobile device, a broadcast receiver device, or a set-top box.

20. A non-transitory computer-readable storage medium having stored thereon instructions that, when executed, cause a processor to:
   determine a size of a current block of a picture of video data, the size comprising one of a plurality of possible sizes for blocks of the video data;
   construct a motion vector predictor list for the current block of the picture of the video data, wherein to construct the motion vector predictor list, the instructions cause the processor to:
      determine motion vectors for blocks of a first set of blocks, the first set of blocks comprising blocks in the picture that immediately neighbor the current block;
      determine a distance from the current block, the distance being a function of the size of the current block, the distance being at least a minimum size of the plurality of possible sizes for the blocks of the video data;
      determine a first motion vector for a first block of a second set of blocks, the second set of blocks comprising blocks in the picture that are separated from the current block by the determined distance;
      determine a second motion vector for a second block of the second set of blocks;
      determine whether the second motion vector is the same as the first motion vector for the first block of the second set of blocks or the same as a motion vector of a block from a subset of blocks of the first set of blocks;
      in response to determining that the second motion vector is not the same as the first motion vector for the first block of the second set of blocks and not the same as any motion vector of any block from the subset of blocks of the first set of blocks, insert the second motion vector as a motion vector predictor in the motion vector predictor list; and
      in response to determining that the second motion vector is the same as the first motion vector for the first block of the second set of blocks or is the same as a motion vector of any block from the subset of blocks of the first set of blocks, bypass inserting the second motion vector as a motion vector predictor in the motion vector predictor list; inter-prediction code the current block using a motion vector for the current block; and code the motion vector using the motion vector predictor list.

21. The non-transitory computer-readable storage medium of claim 20, further comprising instructions that cause the processor to insert the determined motion vectors for the first set of blocks in the motion vector prediction list.

22. The non-transitory computer-readable storage medium of claim 20, wherein the first block of the second set of blocks is a block that is the spatially closest block to the second block, and a block that was previously checked to determine whether the first motion vector is to be included in the motion vector predictor list.

23. The non-transitory computer-readable storage medium of claim 20, wherein the subset of blocks is limited to a number N of the first set of blocks, N being a positive integer value, further comprising instructions that cause the processor to code a value representing N.

24. The non-transitory computer-readable storage medium of claim 20, wherein the instructions that cause the processor to code the motion vector and inter-prediction code the current block comprise instructions that cause the processor to decode the motion vector and inter-prediction decode the current block.

25. The non-transitory computer-readable storage medium of claim 20, wherein the instructions that cause the processor to code the motion vector and inter-prediction code the current block comprise instructions that cause the processor to encode the motion vector and inter-prediction encode the current block.

26. A device for coding video data, the device comprising:
   means for determining a size of a current block of a picture of video data, the size comprising one of a plurality of possible sizes for blocks of the video data;
   means for constructing a motion vector predictor list for the current block of the picture of the video data, wherein the means for constructing the motion vector predictor list comprises:
      means for determining motion vectors for blocks of a first set of blocks, the first set of blocks comprising blocks in the picture that immediately neighbor the current block;
      means for determining a distance from the current block, the distance being a function of the size of the current block, the distance being at least a minimum size of the plurality of possible sizes for the blocks of the video data;
      means for determining a first motion vector for a first block of a second set of blocks, the second set of blocks comprising blocks in the picture that are separated from the current block by the determined distance;
      means for determining a second motion vector for a second block of the second set of blocks;
      means for determining whether the second motion vector is the same as the first motion vector for the first block of the second set of blocks or the same as a motion vector of a block from a subset of blocks of the first set of blocks;
      means for inserting the second motion vector as a motion vector predictor in the motion vector predictor list in response to determining that the second motion vector is not the same as the first motion vector for the first block of the second set of blocks and not the same as any motion vector of any block from the subset of blocks of the first set of blocks; and
      means for bypassing inserting the second motion vector as a motion vector predictor in the motion vector predictor list in response to determining that the second motion vector is the same as the first motion vector for the first block of the second set of blocks or is the same as a motion vector of any block from the subset of blocks of the first set of blocks;
   means for inter-prediction coding the current block using a motion vector for the current block; and means for coding the motion vector using the motion vector predictor list.

27. The device of claim 12, wherein the size of the current block comprises a width of the current block, wherein the distance comprises the width of the current block, and wherein the second set of blocks comprises blocks that are separated to the left of the current block by the width of the current block.

28. The device of claim 12, wherein the size of the current block comprises a height of the current block, wherein the distance comprises the height of the current block, and wherein the second set of blocks comprises blocks that are separated above the current block by the height of the current block.

* * * * *